(12) United States Patent
Kompala et al.

(10) Patent No.: US 11,616,556 B2
(45) Date of Patent: Mar. 28, 2023

(54) BEAM MANAGEMENT TECHNIQUES FOR DAMAGED ANTENNA ELEMENTS

(71) Applicant: QUALCOMM Incorporated, San Diego, CA (US)

(72) Inventors: Surendra Kompala, Fremont, CA (US); Mihir Vijay Laghate, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/574,446

(22) Filed: Jan. 12, 2022

(65) Prior Publication Data

US 2022/0271813 A1    Aug. 25, 2022

Related U.S. Application Data

(60) Provisional application No. 63/152,603, filed on Feb. 23, 2021.

(51) Int. Cl.
    *H04B 7/02*      (2018.01)
    *H04B 7/06*      (2006.01)
    *H04W 76/18*    (2018.01)
    *H04B 7/08*      (2006.01)

(52) U.S. Cl.
    CPC .......... *H04B 7/0639* (2013.01); *H04B 7/086* (2013.01); *H04W 76/18* (2018.02)

(58) Field of Classification Search
    CPC ...... H04B 7/0639; H04B 7/086; H04W 76/18
    USPC ............... 375/262, 260, 259, 219, 296, 316
    See application file for complete search history.

(56) References Cited

U.S. PATENT DOCUMENTS

| | | | |
|---|---|---|---|
| 2019/0149249 A1 | 5/2019 | Raghavan et al. | |
| 2020/0107327 A1* | 4/2020 | Wang | ................... H04J 3/0638 |
| 2020/0145983 A1 | 5/2020 | Levitsky et al. | |
| 2020/0344776 A1 | 10/2020 | Sen et al. | |

OTHER PUBLICATIONS

International Search Report and Written Opinion—PCT/US2022/012336—ISA/EPO—dated May 16, 2022.
(Continued)

*Primary Examiner* — Zewdu A Kassa
(74) *Attorney, Agent, or Firm* — Dalei Dong; Holland & Hart LLP

(57) ABSTRACT

Methods, systems, and devices for wireless communications are described. A first wireless device may communicate with a second wireless device using a first set of beams including a first beam and a second beam, where the first and second beams are generated via first and second sets of antenna elements, respectively. The first wireless device may compare a first power associated with the first beam and a second power associated with the second beam, and may determine that at least one antenna element from the first set of antenna elements, the second set of antenna elements, or both, is defective based on the comparison. The first wireless device may switch from the first set of beams to a second set of beams based on the at least one antenna element being defective, and communicate with the second wireless device using the second set of beams.

30 Claims, 11 Drawing Sheets

(56) References Cited

OTHER PUBLICATIONS

Tareq, E., et al., "Design of Dual-Band Dual-Polarized MIMO Antenna for mm-Wave 5G Base Stations with Octagonal Prism Structure", 2019 IEEE 7th Palestinian International Conference on Electrical and Computer Engineering (PICECE), IEEE, Mar. 26, 2019 (Mar. 26, 2019), XP033569091, pp. 1-6, DOI: 10.1109/PICECE.2019.8747180 [retrieved on Jun. 26, 2019] Section IV.

\* cited by examiner

BEAM MANAGEMENT TECHNIQUES FOR DAMAGED ANTENNA ELEMENTS

CROSS REFERENCE

The present application for patent claims the benefit of U.S. Provisional Patent Application No. 63/152,603 by KOMPALA et al., entitled "BEAM MANAGEMENT TECHNIQUES FOR DAMAGED ANTENNA ELEMENTS," filed Feb. 23, 2021, assigned to the assignee hereof, and expressly incorporated by reference herein.

FIELD OF TECHNOLOGY

The following relates to wireless communications, including beam management techniques for damaged antenna elements.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a UE which is exposed to stress may become damaged. For example, exposure to extreme high temperatures and/or extreme low temperatures may damage antenna elements at a UE. As such, UEs may continue to perform transmissions (e.g., transmit uplink transmissions, receive downlink transmissions) using beams which are generated using defective/damaged antenna elements. The continued use of defective antenna elements may reduce throughput at the UE, and may negatively affect the efficiency and reliability of the UE, thereby negatively affecting user experience.

SUMMARY

The described techniques relate to improved methods, systems, devices, and apparatuses that support beam management techniques for damaged antenna elements. Generally, the present disclosure provides techniques for identifying broken antenna elements at a user equipment (UE). By identifying broken antenna elements, techniques described herein may enable UEs to refrain from performing communications using beams generated via broken antenna elements, thereby improving wireless communications and user experiences. For example, a UE may be configured to communicate using a set of beams (e.g., beam pair) including a first beam (e.g., vertically-polarized beam) and a second beam (e.g., and horizontally-polarized beam). In this example, the UE may determine a first power and a second power (e.g., transmit power, receive power) associated with the first beam and the second beam, respectively. Subsequently, by comparing the first power and the second power, the UE may be able to determine which beam is associated with a defective antenna element. For instance, if the first power (e.g., first transmit power) is significantly less than the second transmit power, the UE may determine that the first beam is associated with a defective antenna element. By communicating using different combinations of set of beams (e.g., combinations of beam pairs), and therefore different combinations of antenna elements, the UE may be configured to identify which individual antenna elements are defective, and may refrain from communicating with beams which are generated using defective antenna elements.

A method for wireless communication at a first wireless device is described. The method may include communicating with a second wireless device using a first set of beams, the first set of beams including a first beam and a second beam, the first beam generated via a first set of antenna elements and the second beam generated via a second set of antenna elements different from the first set of antenna elements, comparing a first power associated with the first beam and a second power associated with the second beam, determining that at least one antenna element from the first set of antenna elements, the second set of antenna elements, or both, is defective based on the comparison, switching from the first set of beams to a second set of beams based on the at least one antenna element being defective, and communicating with the second wireless device using the second set of beams.

An apparatus for wireless communication at a first wireless device is described. The apparatus may include a processor, memory coupled with the processor, and instructions stored in the memory. The instructions may be executable by the processor to cause the apparatus to communicate with a second wireless device using a first set of beams, the first set of beams including a first beam and a second beam, the first beam generated via a first set of antenna elements and the second beam generated via a second set of antenna elements different from the first set of antenna elements, compare a first power associated with the first beam and a second power associated with the second beam, determine that at least one antenna element from the first set of antenna elements, the second set of antenna elements, or both, is defective based on the comparison, switch from the first set of beams to a second set of beams based on the at least one antenna element being defective, and communicate with the second wireless device using the second set of beams.

Another apparatus for wireless communication at a first wireless device is described. The apparatus may include means for communicating with a second wireless device using a first set of beams, the first set of beams including a first beam and a second beam, the first beam generated via a first set of antenna elements and the second beam generated via a second set of antenna elements different from the first set of antenna elements, means for comparing a first power associated with the first beam and a second power associated with the second beam, means for determining that at least one antenna element from the first set of antenna elements, the second set of antenna elements, or both, is defective based on the comparison, means for switching from the first set of beams to a second set of beams based on the at least one antenna element being defective, and means for communicating with the second wireless device using the second set of beams.

A non-transitory computer-readable medium storing code for wireless communication at a first wireless device is described. The code may include instructions executable by a processor to communicate with a second wireless device using a first set of beams, the first set of beams including a first beam and a second beam, the first beam generated via a first set of antenna elements and the second beam generated via a second set of antenna elements different from the first set of antenna elements, compare a first power associated with the first beam and a second power associated with the second beam, determine that at least one antenna element from the first set of antenna elements, the second set of antenna elements, or both, is defective based on the comparison, switch from the first set of beams to a second set of beams based on the at least one antenna element being defective, and communicate with the second wireless device using the second set of beams.

Some examples of the method, apparatuses, and non-transitory computer-readable medium described herein may further include operations, features, means, or instructions for generating an alert indicating that the at least one antenna element may be defective.

In some examples of the method, apparatuses, and non-transitory computer-readable medium described herein, the alert indicates a metric indicative of a performance degradation of the at least one antenna element.

Some examples of the method, apparatuses, and non-transitory computer-readable medium described herein may further include operations, features, means, or instructions for adding one or more beams which may be generated based on the at least one antenna element to a list of blacklisted beams based on determining the at least one antenna element may be defective, where communicating with the second wireless device using the second set of beams may be based on adding the one or more beams to the list of blacklisted beams.

Some examples of the method, apparatuses, and non-transitory computer-readable medium described herein may further include operations, features, means, or instructions for determining that the second set of beams includes beams which may be not included within the list of blacklisted beams, where communicating with the second wireless device using the second set of beams may be based on determining that the second set of beams includes beams which may be not included within the list of blacklisted beams.

Some examples of the method, apparatuses, and non-transitory computer-readable medium described herein may further include operations, features, means, or instructions for initiating a timer based on adding the one or more beams to the list of blacklisted beams, removing the one or more beams from the list of blacklisted beams based on an expiration of the timer, and communicating with the second wireless device using an additional set of beams including at least one beam from the one or more beams based on removing the one or more beams from the list of blacklisted beams.

Some examples of the method, apparatuses, and non-transitory computer-readable medium described herein may further include operations, features, means, or instructions for identifying the one or more beams which may be generated using the at least one antenna element based on a codebook which maps a set of multiple antenna elements of the first wireless device with a set of multiple beams of the first wireless device.

Some examples of the method, apparatuses, and non-transitory computer-readable medium described herein may further include operations, features, means, or instructions for determining the first power may be less than the second power based on the comparison of the first power and the second power and determining that the at least one antenna element which may be defective may be included within the first set of antenna elements based on determining that the first power may be less than the second power.

Some examples of the method, apparatuses, and non-transitory computer-readable medium described herein may further include operations, features, means, or instructions for transmitting, to a base station, an indication of one or more beams which may be generated using the at least one antenna element based on determining the at least one antenna element may be defective.

Some examples of the method, apparatuses, and non-transitory computer-readable medium described herein may further include operations, features, means, or instructions for receiving, from the base station in response to the indication of the one or more beams, an additional indication associated with one or more transmission-configuration indicator (TCI) states for performing communications at the first wireless device, where switching from the first set of beams to the second set of beams, communicating with the second wireless device using the second set of beams, or both, may be based on the one or more TCI states.

Some examples of the method, apparatuses, and non-transitory computer-readable medium described herein may further include operations, features, means, or instructions for communicating with the second wireless device using a third set of beams, the third set of beams including a third beam and one of the first beam or the second beam, the third beam generated via a third set of antenna elements, determining a third power associated with the third beam, and determining the at least one antenna element may be defective may be based on a comparison of the first power, the second power, and the third power.

In some examples of the method, apparatuses, and non-transitory computer-readable medium described herein, the first beam may be associated with a first polarization, and the second beam may be associated with a second polarization which may be different from the first polarization.

In some examples of the method, apparatuses, and non-transitory computer-readable medium described herein, the first beam may be associated with a vertical polarization and the second beam may be associated with a horizontal polarization, or and the first beam may be associated with the horizontal polarization and the second beam may be associated with the vertical polarization.

Some examples of the method, apparatuses, and non-transitory computer-readable medium described herein, communicating with the second wireless device using the first set of beams, the second set of beams, or both, includes transmitting a first transmission to the second wireless device, receiving a second transmission from the second wireless device, or both.

Some examples of the method, apparatuses, and non-transitory computer-readable medium described herein, communicating with the second wireless device using the first set of beams includes transmitting an uplink transmission to the second wireless device, where the first power and the second power include transmission powers associated with the uplink transmission.

Some examples of the method, apparatuses, and non-transitory computer-readable medium described herein, may further include operations, features, means, or instructions for communicating with the second wireless device using the first set of beams includes receiving a downlink transmission from the second wireless device, where the first power and the second power include reception powers associated with the downlink transmission.

In some examples of the method, apparatuses, and non-transitory computer-readable medium described herein, the first wireless device includes a UE, and the second wireless device includes a base station.

DETAILED DESCRIPTION

Figure 1:
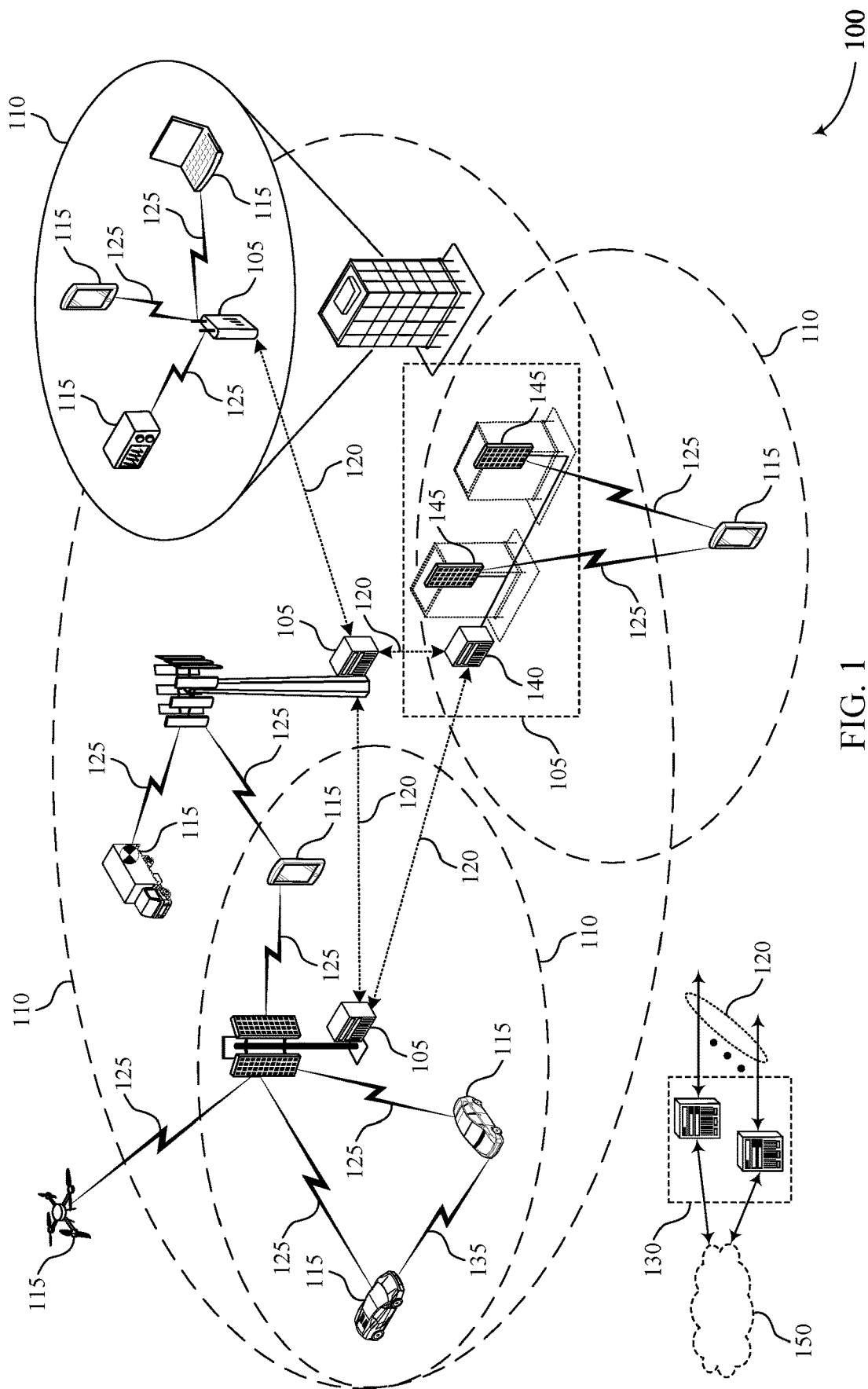
FIG. 1 illustrates an example of a wireless communications system that supports beam management techniques for damaged antenna elements in accordance with aspects of the present disclosure.

In some cases, a user equipment (UE) which is exposed to stress may become damaged. For example, exposure to extreme high temperatures and/or extreme low temperatures may damage antenna elements at a UE. In some cases, UEs may not be configured to self-diagnose defective antenna elements in the field. That is, once the UE passes the manufacturer's testing and is sold to a customer, the UE may not be configured to identify defective antenna elements. As such, UEs may continue to perform transmissions (e.g., transmit uplink transmissions, receive downlink transmissions) using beams which are generated using defective/damaged antenna elements. The continued use of defective antenna elements may reduce throughput at the UE, and may negatively affect the efficiency and reliability of the UE, thereby negatively affecting user experience. Moreover, the continued use of defective antenna elements may cause a temperature of the UE to increase, which may result in a safety concern.

Accordingly, aspects of the present disclosure are directed to techniques for identifying defective antenna elements (e.g., defective antenna feeds) at a UE. By identifying defective antenna elements, techniques described herein may enable UEs to refrain from performing communications using beams generated via defective antenna elements, thereby improving wireless communications and user experiences.

For example, a UE may be configured to communicate using a set of beams (e.g., beam pair) including a first beam (e.g., vertically-polarized beam) and a second beam (e.g., and horizontally-polarized beam). In this example, the UE may determine a first power and a second power (e.g., transmit power, receive power) associated with the first beam and the second beam, respectively. Subsequently, by comparing the first power and the second power, the UE may be able to determine which beam is associated with a defective antenna element. For instance, if the first power (e.g., first transmit power) is significantly less than the second transmit power, the UE may determine that the first beam is associated with a defective antenna element. By communicating using different combinations of sets of beams (e.g., combinations of beam pairs), and therefore different combinations of antenna elements, the UE may be configured to identify which individual antenna elements are defective.

In some aspects, each set of beams used by the UE may include two or more beams. For example, in some cases, a set of beams may include two beams (e.g., beam pair), four beams, and the like. In this regard, for the purposes of the present disclosure, the terms "set of beams" and "beam pair" may be used interchangeably to refer to a set of two or more beams which are used for wireless communications.

In some aspects, upon identifying a defective antenna element, the UE may add beams which are generated using the defective antenna element to a list of blacklisted beams. By adding the beams to the list of blacklisted beams, the UE may ensure that communications are not performed using the defective antenna element. In some aspects, the UE may generate an alert which notifies a user of the defective antenna elements.

Aspects of the disclosure are initially described in the context of wireless communications systems. Additional aspects of the disclosure are described in the context of an example schematic diagram and an example process flow. Aspects of the disclosure are further illustrated by and described with reference to apparatus diagrams, system diagrams, and flowcharts that relate to beam management techniques for damaged antenna elements.

FIG. 1 illustrates an example of a wireless communications system 100 that supports beam management techniques for damaged antenna elements in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 of the wireless communications system 100 may be configured to support techniques for identifying defective antenna elements at the UEs 115. By identifying defective antenna elements, techniques described herein may enable UEs 115 to refrain from performing communications using beams generated via defective antenna elements, thereby improving wireless communications and user experiences.

For example, a UE 115 of the wireless communications system 100 may be configured to communicate using a set of two or more beams (e.g., beam pair) including a first beam (e.g., vertically-polarized beam) and a second beam (e.g., and horizontally-polarized beam). In this example, the UE 115 may determine a first power and a second power (e.g., transmit power, receive power) associated with the first beam and the second beam, respectively. Subsequently, by comparing the first power and the second power, the UE 115 may be able to determine which beam is associated with a defective antenna element. For instance, if the first power (e.g., first transmit power) is significantly less than the second transmit power, the UE 115 may determine that the first beam is associated with a defective antenna element. By communicating using different combinations of sets of beams, and therefore different combinations of antenna elements, the UE 115 may be configured to identify which individual antenna elements are defective.

In some aspects, upon identifying a defective antenna element, the UE 115 may add beams which are generated using the defective antenna element to a list of blacklisted beams. By adding the beams to the list of blacklisted beams, the UE 115 may ensure that communications are not performed using the defective antenna element. According to some implementations, the UE 115 may be configured to remove beams from the list of blacklisted beams after some time (e.g., after an expiration of a timer) so that the UE 115 may re-test the beams to determine whether antenna elements are still defective. In additional or alternative aspects, the UE 115 may generate an alert which notifies a user of the defective antenna elements.

Techniques described herein may enable UEs 115 to identify defective antenna elements, and refrain from performing communications using beams which are generated using defective antenna elements. Accordingly, techniques described herein may improve a reliably of wireless communications performed at the UE 115, thereby reducing a quantity of retransmissions which are performed by the UE 115, reducing power consumption, improving battery life, and improving overall user experience. Further, techniques described herein may reduce or eliminate increased in operational temperatures at the UE 115 which are attributable to defective antenna elements, thereby further improving battery performance and preventing potential safety concerns.

Figure 2:
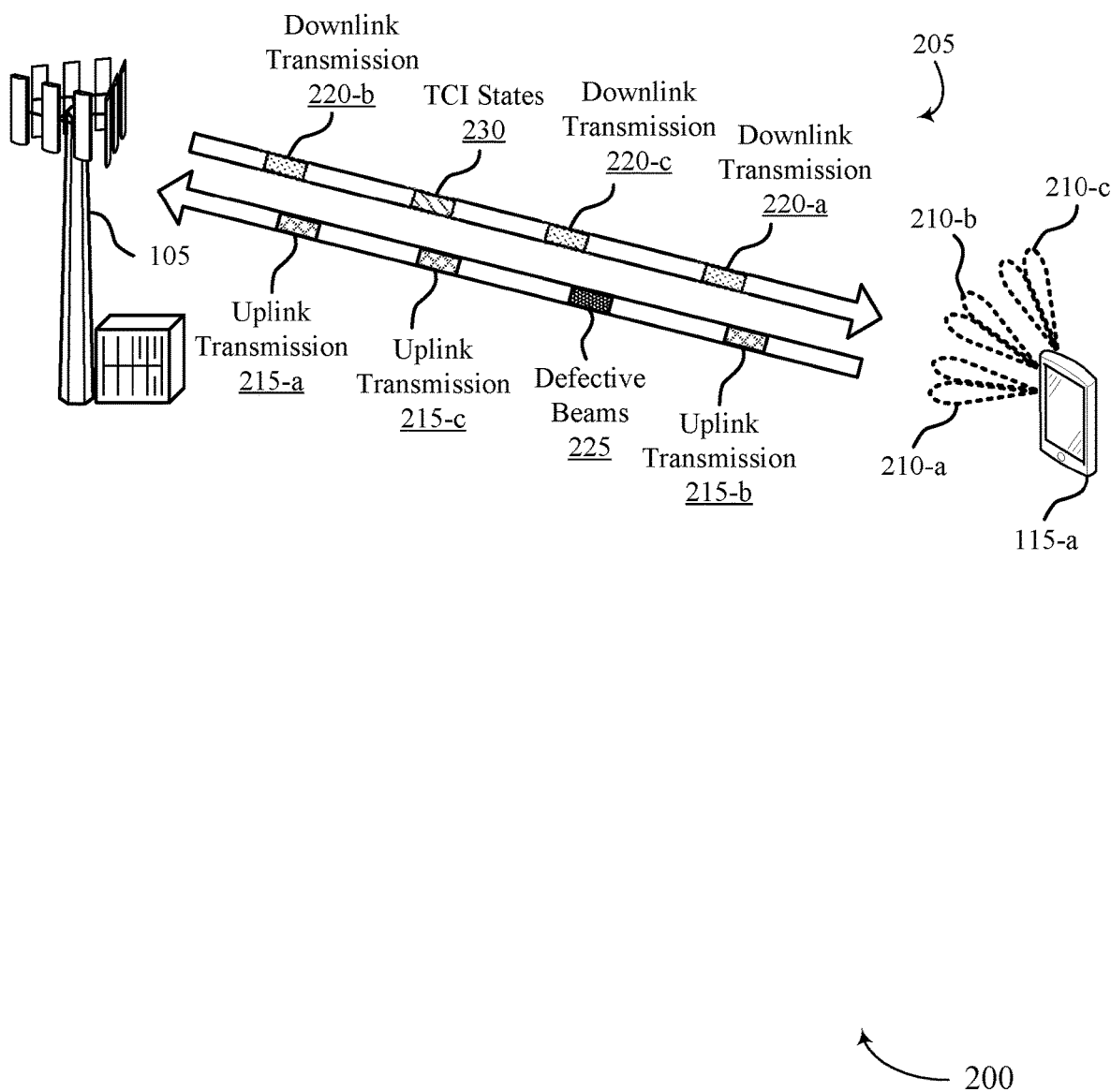
FIG. 2 illustrates an example of a wireless communications system that supports beam management techniques for damaged antenna elements in accordance with aspects of the present disclosure.

FIG. 2 illustrates an example of a wireless communications system 200 that supports beam management techniques for damaged antenna elements in accordance with aspects of the present disclosure. In some examples, wireless communications system 200 may implement aspects of wireless communications system 100. Wireless communications system 200 may support techniques for identifying defective antenna elements, as described with reference to FIG. 1.

The wireless communications system 200 may include a base station 105 and a UE 115, which may be examples of UEs 115, base stations 105, and other wireless devices as described with reference to FIG. 1. In some aspects, the UE 115 may communicate with the base station 105 using a communication link 205, which may be an example of an NR or LTE link between the base station 105 and the UE 115. In some aspects, communication link 205 may include an example of an access link (e.g., Uu link) which may include bi-directional links that enable both uplink and downlink communication. For example, the UE 115 may transmit uplink signals, such as uplink control signals or uplink data signals, to the base station 105 using the communication link 205, and the base station 105 may transmit downlink signals, such as downlink control signals or downlink data signals, to the UE 115 using the communication link 205.

In some aspects, the UE 115 and the base station 105 may communicate with one another using one or more beams, one or more carriers, one or more communications links, or any combination thereof. In some aspects, the UE 115 may communicate with the base station 105 via one or more sets of beams (e.g., beam pairs 210). In some aspects, each beam pair 210 may include a pair of beams. For example, the UE 115 may be configured to use a first beam pair 210-*a* including a first beam and a second beam. By way of another example, the UE 115 may be configured to use a second beam pair 210-*b* including a third beam and a fourth beam. In some aspects, each beam of each beam pair 210 may be generated using a set of antenna elements (e.g., set of antenna feeds) of the UE 115. For example, the first beam of the first beam pair 210-*a* may be generated using a first set of antenna elements, and the second beam of the first beam pair 210-*a* may be generated using a second set of antenna elements which is different from the first set of antenna elements.

The UE 115 illustrated in FIG. 2 is shown and described as being configured to communicate using one or more beam pairs 210, where each beam pair 210 includes two beams. However, the UE 115 may be configured to communicate using one or more sets of beams, where each set of beams includes two or more beams. For example, the UE 115 may be configured to communicate with a first set of beams and a second set of beams, where each of the first and second sets of beams include two beams, four beams, or the like.

In some aspects, the base station 105, the UE 115, or both, may perform directional beamforming for performing transmissions via the communication link 205. The UE 115 may be configured to perform beam switching procedures to transition from one beam pair 210 to another. For example, the UE 115 may be configured to communicate using the first beam pair 210-*a*, and may perform a beam switching procedure to transition from the first beam pair 210-*a* to the second beam pair 210-*b* in order to communicate according to the second beam pair 210-*b*. Beam switching procedures may involve processing at the UE 115, retuning of radio frequency components, or both. In some cases, different beams within each beam pair 210 may be configured according to different parameters (e.g., different transmission-configuration indicator (TCI) states, transmission powers).

As noted previously herein, UEs 115 which are exposed to stress may become damaged. For example, exposure to extreme high temperatures and/or extreme low temperatures may damage antenna elements at a UE 115. In some cases, UEs 115 may not be configured to self-diagnose defective antenna elements in the field. As such, UEs 115 may continue to perform transmissions (e.g., transmit uplink transmissions, receive downlink transmissions) using beams (e.g., beam pairs 210) which are generated using defective/damaged antenna elements. The continued use of defective antenna elements may reduce throughput at the UE 115, and may negatively affect the efficiency and reliability of the UE 115, thereby negatively affecting user experience. Moreover, the continued use of defective antenna elements may cause a temperature of the UE 115 to increase, which may result in a safety concern.

Accordingly, the UE 115 of the wireless communications system 200 may support techniques for identifying defective antenna elements at the UE 115. By identifying defective antenna elements, techniques described herein may enable the UE 115 to refrain from performing communications using beams (e.g., beam pairs 210) which are generated via defective antenna elements, thereby improving wireless communications and user experience at the UE 115.

For example, the UE 115 may communicate with the base station 105 using a first beam pair 210-*a*. In some aspects, the first beam pair 210-*a* may include a first beam and a second beam, where the first beam is generated using a first set of antenna elements of the UE 115 and the second beam is generated using a second set of antenna elements of the UE 115 which are different from the first set of antenna elements.

The communications performed using the first beam pair 210-*a* may include uplink communications, downlink communications, sidelink communications, or any combination thereof. For example, the UE 115 may transmit an uplink transmission 215-*a* using the first beam pair 210-*a*, receive a downlink transmission 220-*a* using the first beam pair 210-*a*, or both. Additionally, or alternatively, the UE 115 may transmit and/or receive sidelink transmissions using the first beam pair 210-*a*.

In some aspects, the first beam and the second beam of the first beam pair 210-*a* may be associated with different polarizations. For example, the first beam may be associated with a first polarization, and the second beam may be associated with a second polarization which is different from the first polarization. For instance, in some cases, the first beam may be associated with a vertical polarization, and the second beam may be associated with a horizontal polarization. Conversely, in other cases, the first beam may be associated with a horizontal polarization, and the second beam may be associated with a vertical polarization.

Subsequently, the UE 115 may communicate with the base station 105 using a third beam pair 210-*c*. The UE 115 may perform communications using the third beam pair 210-*c* based on performing communications using the first beam pair 210-*a*. In some aspects, the third beam pair 210-*c* may include a third beam and at least one of the first beam or the second beam from the first beam pair 210-*a*, where the third beam is generated using a third set of antenna elements of the UE 115. For example, the UE 115 may perform communications using the third beam pair 210-*c* which includes the first beam of the first beam pair 210-*a* and the third beam. By way of another example, the UE 115 may perform communications using the third beam pair 210-*c* which includes the second beam of the first beam pair 210-*a* and the third beam.

The communications performed using the third beam pair 210-*c* may include uplink communications, downlink communications, sidelink communications, or any combination thereof. For example, the UE 115 may transmit an uplink transmission 215-*c* using the third beam pair 210-*c*, receive a downlink transmission 220-*c* using the third beam pair 210-*c*, or both. Additionally, or alternatively, the UE 115 may transmit and/or receive sidelink transmissions using the third beam pair 210-*c*.

In some aspects, as noted previously herein, the third beam and the first or second beam of the third beam pair 210-*c* may be associated with different polarizations (e.g., horizontal polarization, vertical polarization). In some cases, the UE 115 may perform communications using different beam pairs including different combinations of beams in order to identify antenna elements which may be defective. In this regard, the UE 115 may be configured to perform communications using any quantity of beam pairs 210.

In some aspects, the UE 115 may determine powers associated with the beams of the respective beam pairs 210 (e.g., first beam pair 210-*a*, third beam pair 210-*c*) used for communications at the UE 115. For example, the UE 115 may determine a first power and a second power associated with the first beam and the second beam of the first beam pair 210-*a*, respectively. Additionally, the UE 115 may determine a third power associated with the third beam of the third beam pair 210-*c*. In some aspects, the UE 115 may determine powers associated with the beams of the respective beam pairs using a power detection (PDET) module of the UE 115.

In some aspects, the type of power associated with the respective beams may vary depending on the types of communications which are performed according to the first beam pair 210-*a* and the third beam pair 210-*c*. For example, in cases where the UE 115 transmits an uplink transmission 215-*a* using the first beam pair 210-*a*, the first power and the second power associated with the first beam and the second beam of the first beam pair 210-*a*, respectively, may include transmission powers associated with the uplink transmission 215-*a*. By way of another example, in cases where the UE 115 receives a downlink transmission 220-*a* using the first beam pair 210-*a*, the first power and the second power associated with the first beam and the second beam of the first beam pair 210-*a*, respectively, may include reception powers associated with the downlink transmission 220-*a*.

In some cases, defective antenna elements at the UE 115 may detrimentally affect a power associated with a beam generated by the defective antenna element. In particular, defective antenna elements may result in errors in power readings which are performed at a PDET module of the UE 115 (e.g., result in PDET error). Specifically, defective antenna elements may detrimentally affect transmission and reception powers associated with beams generated using the defective antenna elements, where PDET module power readings do not scale in line with a residual gain indicator (RGI) for the respective beam.

Accordingly, by performing communications with different beam pairs 210 using different combinations of beams (and therefore different combinations of antenna elements), the comparison of powers associated with different beams may be used to iteratively test for (e.g., binary search) and identify defective antenna elements. In this regard, the UE 115 may be configured to compare the powers associated with the beams of the beam pairs 210 in order to identify defective antenna elements. For example, the UE 115 may compare the first power and the second power associated with the first beam and the second beam of the first beam pair 210-*a*, respectively. By way of another example, in cases where the third beam pair 210-*c* includes the third beam and the first beam, the UE 115 may compare the third power and a first power associated with the third beam and the first beam of the third beam pair 210-*c*, respectively. Similarly, in cases where the third beam pair 210-*c* includes the third beam and the second beam, the UE 115 may compare the third power and a second power associated with the second beam and the first beam of the third beam pair 210-*c*, respectively.

In some aspects, the UE 115 may determine (e.g., identify) one or more defective antenna elements. In some aspects, the UE 115 may determine that one or more antenna elements are defective based on performing the communications with the first beam pair 210-*a*, performing the communications with the third beam pair 210-*b*, determining the powers of the respective beams, comparing the powers of the beams, or any combination thereof.

In particular, in some cases, a defective antenna element may generate a beam which is less efficient for transmitting communications (e.g., transmitting uplink communications) and/or receiving communications (e.g., receiving downlink communications). As such, a defective antenna element may reduce a transmission power of a transmission performed using a beam generated by the defective antenna element, and may reduce a reception power of a transmission received using a beam generated by the defective antenna element. This may result in a PDET error at the UE 115 with respect to a beam of the beam pair 210. In other words, a PDET error attributable to a defective antenna element may impact a single beam (e.g., beam with a first polarization) of a beam pair 210, but not the other beam (e.g., beam with a second polarization) of the beam pair 210. Accordingly, differences in powers associated with beams of the respective beam pairs 210 may be used to identify beams which are generated with defective antenna elements.

For example, in some cases, the UE 115 may determine that the first power ($P_1$) associated with the first beam of the first beam pair 210-*a* is less than the second power ($P_2$) associated with the second beam of the first beam pair 210-*a* (e.g., $P_1 < P_2$). In this example, the UE 115 may determine that at least one antenna element of the first set of antenna elements is defective based on the first power being less than the second power (e.g., based on determining $P_1 < P_2$). In other words, the UE 115 may determine that at least one antenna element of the first set of antenna elements is defective based on determining a PDET error associated with the first beam.

Conversely, by way of another example, the UE 115 may determine that the second power ($P_2$) associated with the second beam of the first beam pair 210-*a* is less than the first power ($P_1$) associated with the first beam of the first beam pair 210-*a* (e.g., $P_2<P_1$). In this example, the UE 115 may determine that at least one antenna element of the second set of antenna elements is defective based on the second power being less than the first power (e.g., based on determining $P_2<P_1$). In other words, the UE 115 may determine that at least one antenna element of the second set of antenna elements is defective based on determining a PDET error associated with the second beam.

Continuing with the same example, upon determining that the first set of antenna elements and/or the second set of antenna elements includes a defective antenna element, the UE 115 may continue comparing powers of different beams of different beam pairs 210 to iteratively determine (e.g., via binary search methods) which specific antenna element(s) of the respective sets of antenna elements are defective.

For instance, the UE 115 may determine that the first set of antenna elements and the third set of antenna elements both include a defective antenna element. In this example, the UE 115 may additionally determine that a single antenna element is shared across the first set of antenna elements and the third set of antenna elements, and may therefore determine that the single antenna element is defective.

In some aspects, the UE 115 may generate an alert indicating that the at least one antenna element is defective. The alert may include a visual alert, an audio alert, a haptic alert (e.g., vibration), and the like. For example, the alert may be displayed as a push notification on a graphical user interface (GUI) of the UE 115. In some aspects, the alert may indicate a metric indicative of a performance degradation of the at least one antenna element. For example, the alert may indicate that the at least one antenna element is defective, but that the defect of the antenna element will result in only marginal degradation of the performance of the antenna element, beams generated by the antenna element, the UE 115, or any combination thereof. As such, the alert may notify the user of the defective antenna element, but indicate that the defect will not prevent efficient operation of the UE 115. Comparatively, by way of another example, the alert may indicate that the at least one antenna element is defective, and that the defect of the antenna element will result in significant degradation of the performance of the antenna element, beams generated by the antenna element, the UE 115, or any combination thereof. As such, the alert may indicate that the defect may prevent efficient operation of the UE 115, and may instruct the user to consider replacing or repairing the defective antenna element and/or UE 115.

In some aspects, the UE 115 may identify beams which are (or are not) generated using defective antenna elements. In this regard, UE 115 may identify beams which are (or are not) generated using defective antenna elements based on performing the communications with the first beam pair 210-*a*, performing the communications with the third beam pair 210-*c*, determining the powers of the respective beams, comparing the powers of the beams, determining defective antenna elements, or any combination thereof.

For example, upon identifying a defective antenna element within the first set of antenna elements used to generate the first beam, the UE 115 may determine that the first beam is associated with a defective antenna element, and may therefore exhibit degraded performance. Continuing with this example, the UE 115 may identify one or more additional beams which are generated using the defective antenna element.

In some aspects, the UE 115 may identify one or more beams which are generated using defective antenna elements based on a codebook which maps antenna elements of the UE 115 with beams of the UE 115. For example, Table 1 below illustrates an example codebook at the UE 115 which maps sets of one or more antenna elements to beams which may be used for communications at the UE 115:

TABLE 1

Codebook Mapping Beams and Antenna Elements

| Beam ID | Polarization (AG) | Antenna Element(s) | Beam Level | Paired Beam |
|---|---|---|---|---|
| 0 | 0 | 13 | 1 | 128 |
| 1 | 0 | 10 | 1 | 129 |
| 2 | 0 | 12 | 1 | 130 |
| 3 | 0 | 11 | 1 | 131 |
| 6 | 0 | 9, 13 | 2 | 134 |
| 7 | 0 | 13, 10 | 2 | 135 |
| 8 | 0 | 14, 9 | 2 | 136 |
| 9 | 0 | 12, 11 | 2 | 137 |
| 10 | 0 | 14, 11 | 2 | 138 |
| 11 | 0 | 9, 11 | 2 | 139 |
| 15 | 0 | 14, 9 | 2 | 143 |
| 16 | 0 | 15, 9 | 2 | 144 |
| 17 | 0 | 5, 11 | 2 | 145 |
| 18 | 0 | 4, 11 | 2 | 146 |
| 128 | 1 | 5 | 1 | 0 |
| 129 | 1 | 2 | 1 | 1 |
| 130 | 1 | 8 | 1 | 2 |
| 131 | 1 | 7 | 1 | 3 |
| 134 | 1 | 1, 5 | 2 | 6 |
| 135 | 1 | 6, 1 | 2 | 7 |
| 136 | 1 | 6, 1 | 2 | 8 |
| 137 | 1 | 8, 7 | 2 | 9 |
| 138 | 1 | 8, 6 | 2 | 10 |
| 139 | 1 | 8, 5 | 2 | 11 |
| 143 | 1 | 1, 5 | 2 | 15 |
| 144 | 1 | 6, 1 | 2 | 16 |
| 145 | 1 | 8, 7 | 2 | 17 |
| 146 | 1 | 8, 7 | 2 | 18 |

As may be seen in Table 1, the codebook at the UE 115 may map sets of one or more antenna elements to beams which are generated using the respective sets of antenna elements. Moreover, the codebook may illustrate beam pairs 210 by mapping beams of a first polarization (e.g., AG0) to beams of a second polarization (e.g., AG1). As may be seen in the codebook illustrated above, if antenna element number 11 becomes damaged or defective, this may result in PDET errors (e.g., transmit power errors, receive power errors) on beam IDs 3, 9, 10, 11, 17, and 18 associated with the first polarization (e.g., AG0), but not on beams associated with the second polarization (e.g., AG1). As such, the comparison of powers between beams of different polarizations associated with the same beam pair 210 may be used to identify defective antenna elements.

Through identifying beams which are associated with defective antenna elements, the UE 115 may additionally identify beams which are not associated with defective antenna elements. In this regard, the UE 115 may determine which antenna elements of the UE 115 may exhibit degraded performance, and which may exhibit expected performance.

In some aspects, the UE 115 may add one or more beams which are generated using defective antenna elements to a list of blacklisted beams. In this regard, the UE 115 may add the one or more beams to the list of blacklisted beams based on determining the one or more defective antenna elements, determining beams which are generated using defective antenna element, or both. In some aspects, the UE 115 may be configured to refrain from performing communications using beams which are included in the list of blacklisted beams. As such, the UE 115 may be configured to add the one or more beams which are generated using defective antenna elements to the list of blacklisted beams to ensure that the beams are not used for wireless communications.

The UE 115 may initiate a timer based on adding the one or more beams to the list of blacklisted beams. In some aspects, the timer may define a duration of time in which the one or more beams will remain within the list of blacklisted beams, and therefore define a duration of time that the one or more beams will not be used for wireless communications. In some aspects, the duration of the timer may be signaled to the UE 115 (e.g., via RRC signaling or other control signaling), configured (e.g., pre-configured) at the UE 115, or both. Additionally, or alternatively, the UE 115 may selectively adjust the duration of the timer based on one or more parameters including, but not limited to, a quantity of beams within the list of blacklisted beams, a severity of the defect associated with the defective antenna elements, and the like.

In some aspects, the UE 115 may transmit an indication of the one or more beams which are generated using the at least one defective antenna element (e.g., indication of defective beams 225). In this regard, the UE 115 may transmit the indication of the one or more defective beams 225 based on determining the one or more defective antenna elements, determining beams which are generated using defective antenna element, or both. Additionally, or alternatively, the UE 115 may transmit the indication of the one or more defective beams 225 based on adding the one or more defective beams to the list of blacklisted beams. For example, in some cases, the UE 115 may transmit an indication of the list of blacklisted beams, an indication of a codebook which maps beams to antenna elements, or both.

In some aspects, the indication of the one or more defective beams 225 transmitted by the UE 115 may serve as a request for the base station 105 not to configure the UE 115 to perform wireless communications with the one or more defective beams 225. In other words, the UE 115 may transmit the indication of the one or more defective beams 225 so that the base station 105 does not request or expect the UE 115 to perform communications with beams that are generated using defective antenna elements.

In some aspects, the UE 115 may receive, from the base station 105, an indication associated with one or more TCI states 230 for performing communications at the UE 115. The UE 115 may receive the one or more TCI states 230 based on (e.g., in response to) transmitting the indication of the one or more defective beams 225. In some aspects, the one or more TCI states 230 may be associated with one or more beams at the UE 115. In this regard, the one or more TCI states 230 may instruct the UE 115 to perform wireless communications with the one or more beams which are associated with the one or more indicated TCI states 230. In some cases, the one or more TCI states 230 may be associated with beams which were not indicated to the base station 105 via the indication of defective beams 225, and which are not generated using defective antenna elements. In other words, the base station 105 may configure the UE 115 to perform wireless communications with beams which are not included within the list of blacklisted beams (e.g., beams which are not generated using defective antenna elements) via the indication of the TCI states 230.

In some aspects, the UE 115 may switch from the first beam pair 210-*a* (and/or third beam pair 210-*c*) to a second beam pair 210-*b*. In some aspects, the UE 115 may switch from the first beam pair 210-*a* to the second beam pair 210-*b* based on determining the one or more defective antenna elements, determining beams which are generated using defective antenna elements, or both. Additionally, or alternatively, the UE 115 may switch from the first beam pair 210-*a* to the second beam pair 210-*b* based on adding the one or more beams to the list of blacklisted beams, determining that the second beam pair 210-*b* is generated using beams which are not included within the list of blacklisted beams, receiving the one or more TCI states 230, any combination thereof.

For example, in some aspects, the one or more TCI states 230 may indicate two beams which are associated with the second beam pair 210-*b*, and the UE 115 may switch to the second beam pair 210-*b* based on (e.g., in accordance with) the one or more TCI states 230. The UE 115 may be configured to perform one or more beam switching procedures in order to switch from the first beam pair 210-*a* (and/or third beam pair 210-*c*) to the second beam pair 210-*b*. In some aspects, beam switching procedures performed by the UE 115 may include retuning of radio frequency components, back-end processing, and the like.

Subsequently, the UE 115 may communicate with the base station 105 using the second beam pair 210-*b*. The communications performed using the second beam pair 210-*b* may include uplink communications, downlink communications, sidelink communications, or any combination thereof. For example, the UE 115 may transmit an uplink transmission 215-*b* using the second beam pair 210-*b*, receive a downlink transmission 220-*b* using the second beam pair 210-*b*, or both. Additionally, or alternatively, the UE 115 may transmit and/or receive sidelink transmissions using the second beam pair 210-*b*. In some aspects, as noted previously herein, the beams of the second beam pair 210-*b* may be associated with different polarizations (e.g., horizontal polarization, vertical polarization).

In some aspects, the second beam pair 210-*b* may include beams which are not generated using defective antenna elements. As such, the UE 115 may communicate using the second beam pair 210-*b* based on determining the one or more defective antenna elements, determining beams which are not generated using defective antenna elements, adding the one or more beams to the list of blacklisted beams, initiating the timer, transmitting the indication of the defective beams 225, receiving the one or more TCI states 230, switching to the second beam pair 210-*b*, or any combination thereof. Moreover, the UE 115 may communicate using the second beam pair 210-*b* based on determining that the beams associated with the second beam pair 210-*b* are not included within the list of blacklisted beams.

In some implementations, the UE 115 may determine an expiration of the timer. The UE 115 may determine the expiration of the timer based on adding the one or more beams to the list of blacklisted beams, initiating the timer, the duration of the timer, or any combination thereof. As noted previously herein, the duration of the timer may be signaled to the UE 115, pre-configured at the UE 115, or both. Subsequently, the UE 115 may remove the one or more beams from the list of blacklisted beams. In other words, the UE 115 may remove the beams which were added to the list of blacklisted beams from the list of blacklisted beams. In some aspects, the UE 115 may remove the one or more beams from the list of blacklisted beams based on the expiration of the timer. In some aspects the UE 115 may remove the one or more beams from the list of blacklisted beams in order to re-test the beams and determine whether or not the antenna elements used to generate the beams are still defective.

The UE 115 may perform communications using an additional beam pair 210 (not shown). In some aspects, the additional beam pair 210 may include one or more beams which were added to the list of blacklisted beams and/or removed from the list of blacklisted beams. In this regard, the UE 115 may perform wireless communications using the additional beam pair 210 in order to test whether antenna elements used to generate the beams of the additional beam pair 210 are still defective.

Accordingly, the UE 115 may be configured to repeat steps/functions described herein in order to re-test the antenna elements associated with the additional beam pair 210. For example, the UE 115 may be configured to determine beam powers associated with the beams of the additional beam pair 210, compare the determined powers, determine whether the antenna elements are still defective (and/or if other antenna elements are defective), determine whether the beams are still defective, re-add defective beams to the list of blacklisted beams, initiate a timer for the blacklisted beams, inform the base station 105 of the defective beams, determine an expiration of the timer, and remove the blacklisted beams to re-test the antenna elements.

In some aspects, the UE 115 may be configured to continuously perform the cyclical process of testing beams, adding beams to the list of blacklisted beams, and removing the beams from the list of blacklisted beams. However, in some implementations, the UE 115 may be configured to leave beams in the list of blacklisted beams indefinitely. For example, if a given beam has been added and removed from the list of blacklisted beams a threshold quantity of times, the UE 115 may be configured to permanently blacklist the given beam.

Techniques described herein may enable the UE 115 to identify defective antenna elements, and refrain from performing communications using beams which are generated using defective antenna elements. Accordingly, techniques described herein may improve a reliably of wireless communications performed at the UE 115, thereby reducing a quantity of retransmissions which are performed by the UE 115, reducing power consumption, improving battery life, and improving overall user experience. Further, techniques described herein may reduce or eliminate increased operational temperatures at the UE 115 which are attributable to defective antenna elements, thereby further improving battery performance and preventing potential safety concerns.

Figure 3:
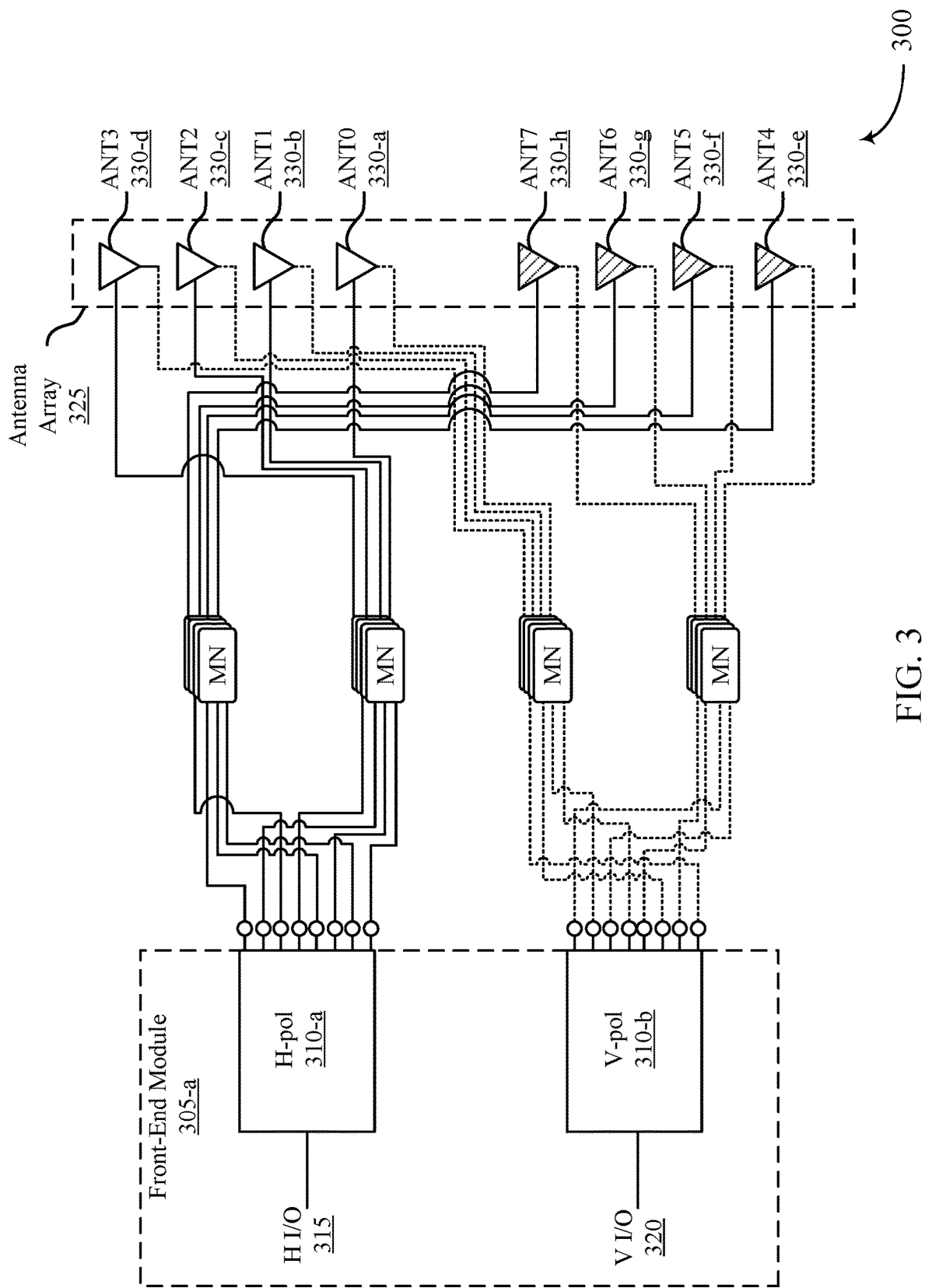
FIG. 3 illustrates an example of a schematic diagram that supports beam management techniques for damaged antenna elements in accordance with aspects of the present disclosure.

FIG. 3 illustrates an example of a schematic diagram 300 that supports beam management techniques for damaged antenna elements in accordance with aspects of the present disclosure. The schematic diagram may implement, or be implemented by, aspects of wireless communications system 100, wireless communications system 200, or both.

In some aspects, schematic diagram 300 illustrates a front-end module 305 of a UE 115 which may be configured for directional beamforming. In particular, the schematic diagram 300 illustrates mappings between components 310 of a front-end module 305 of the UE 115 and antenna elements 330 of an antenna array 325 of the UE 115.

In some aspects, the front-end module 305 may include a first component 310-*a* and a second component 310-*b*. In some aspects, each component 310 may include one or more sub-components. For example, in some cases, each of the first component 310-*a* and the second component 310-*a* may include two sub-components (e.g., two "quadrants" per component 310). In some aspects, as shown in FIG. 3, each component 310 may be configured to drive eight antenna feeds. In some aspects, the respective components 310 may be associated with different polarizations. For example, the first component 310-*a* may be associated with a horizontal polarization, whereas the second component 310-*b* may be associated with a vertical polarization.

In some aspects, the components 310 may be used to generate sets of beams (e.g., beam pairs 210 as illustrated in FIG. 2), where each set of beams includes two or more beams (e.g., two beams, four beams). For example, a set of beams (e.g., beam pair) may include a first beam of a first polarization (e.g., horizontal polarization) and a second beam of a second polarization (e.g., vertical polarization). For instance, a horizontal input/output 315 generated via the first component 310-*a* may be combined with a vertical input/output 320 generated via the second component 310-*b* to generate the respective beams which make up a set of beams, as described previously herein.

For the purposes of simplicity and to more clearly illustrate the individual mappings between the components 310 and the respective antenna elements 330, the antenna elements 330 of the antenna array 325 are illustrated as including separate high-band and low-band antenna elements. In this regard, the antenna array 325 illustrates both high-band and low-band antenna elements 330 independently from one another. For example, in some aspects, the first antenna element 330-*a*, the second antenna element 330-*b*, the third antenna element 330-*c*, and the fourth antenna element 330-*d* may illustrate high-band antenna elements, whereas the fifth antenna element 330-*e*, the sixth antenna element 330-*f*, the seventh antenna element 330-*g*, and the eighth antenna element 330-*h* may illustrate low-band antenna elements.

In some aspects, each component 310 may include multiple (e.g., eight) connections, or mappings, to an antenna array 325. The antenna array 325 may include a set of antenna elements 330. For example, the antenna array 325 may include a first antenna element 330-*a* (ANT0), a second antenna element 330-*b* (ANT1), a third antenna element 330-*c* (ANT2), a fourth antenna element 330-*d* (ANT3), a fifth antenna element 330-*e* (ANT4), a sixth antenna element 330-*f* (ANT5), a seventh antenna element 330-*g* (ANT6), and an eighth antenna element 330-*h* (ANT7). In this regard, each component 310 of the front-end module 305 may include multiple connections to the respective antenna elements 330 of the antenna array 325. In some aspects, the components 310 (e.g., first component 310-*a*, second component 310-*b*) may include mappings to any quantity of antenna elements 330 which are included within any quantity of antenna arrays 325.

As noted previously herein, a defective antenna element 330 may detrimentally affect a power associated with a beam generated by the defective antenna element 330. In particular, defective antenna elements 330 may result in errors in power readings which are performed at a PDET module of the UE 115 (e.g., result in PDET error, residual error). In this regard, differences in power readings associated with different beams (e.g., differently polarized beams) of a set of beams (e.g., beam pair 210) may be used to identify defective antenna elements.

For example, a UE 115 may perform communications using a beam pair including a first beam associated with a first polarization (e.g., generated via the first component 310-*a*) and a second beam associated with a second polarization (e.g., generated via the second component 310-*b*). In this example, power readings (e.g., PDET readings) may be read/monitored across each of the respective components 310. In this example, a defective antenna element 330 may result in a power error (e.g., PDET error, residual error) for a beam associated with one polarity, but not the other. In other words, a defective antenna element 330 may result in a PDET error in one of the horizontal input/output 315 or the vertical input/output 320, but not in both. As such, a comparison of the powers determined on the horizontal input/output 315 or the vertical input/output 320 may be used to identify defective antenna elements 330.

Figure 4:
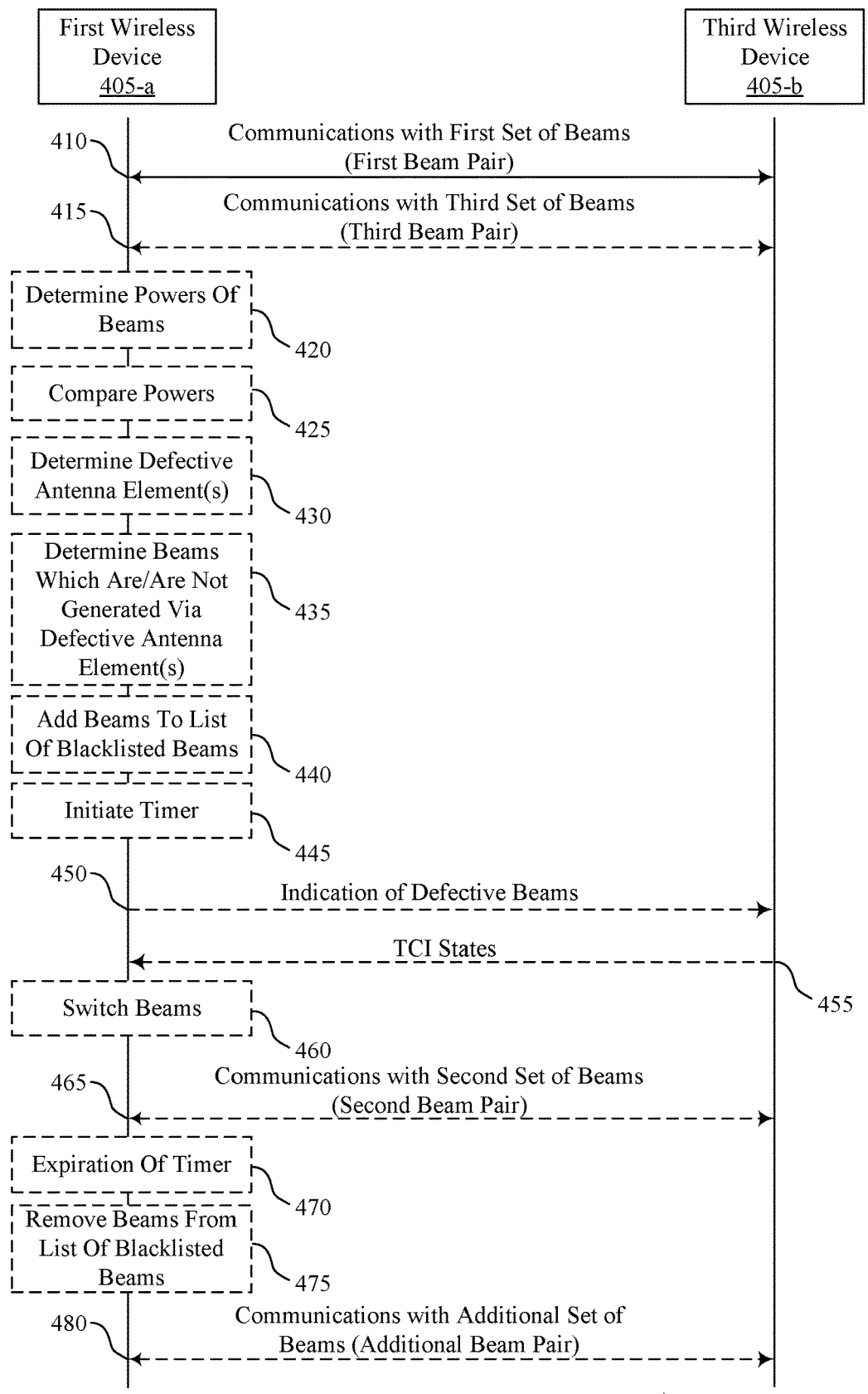
FIG. 4 illustrates an example of a process flow that supports beam management techniques for damaged antenna elements in accordance with aspects of the present disclosure.

FIG. 4 illustrates an example of a process flow 400 that supports beam management techniques for damaged antenna elements in accordance with aspects of the present disclosure. In some examples, process flow 400 may implement, or be implemented by, aspects of wireless communications system 100, wireless communications system 200, schematic diagram 300, or any combination thereof. For example, the process flow 400 may illustrate a first wireless device 405-a performing communications using a first set of beams (e.g., first beam pair), identifying one or more defective antenna elements, and switching to a different set of beams (e.g., different beam pair) based on the one or more antenna elements being defective, as described with reference to FIGS. 1-3, among other aspects.

In some aspects, the process flow 400 may include a first wireless device 405-a and a second wireless device 405-b, which may include examples of UEs 115, base stations 105, and other wireless devices described with reference to FIGS. 1-3. For example, the first wireless device 405-a illustrated in FIG. 4 may be an example of the UE 115 illustrated in FIG. 2, and the second wireless device 405-b illustrated in FIG. 4 may be an example of the base station 105 illustrated in FIG. 2.

In some examples, the operations illustrated in process flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 410, the first wireless device 405-a may communicate with the second wireless device 405-b using a first set of beams (e.g., first beam pair). In some aspects, the first set of beams may include a first beam and a second beam, where the first beam is generated using a first set of antenna elements of the first wireless device 405-a and the second beam is generated using a second set of antenna elements of the first wireless device 405-a which are different from the first set of antenna elements. The communications performed using the first set of beams may include uplink communications, downlink communications, sidelink communications, or any combination thereof.

In some aspects, the first beam and the second beam of the first set of beams may be associated with different polarizations. For example, the first beam may be associated with a first polarization, and the second beam may be associated with a second polarization which is different from the first polarization. For instance, in some cases, the first beam may be associated with a vertical polarization, and the second beam may be associated with a horizontal polarization. Conversely, in other cases, the first beam may be associated with a horizontal polarization, and the second beam may be associated with a vertical polarization.

At 415, the first wireless device 405-a may communicate with the second wireless device 405-b using a third set of beams (e.g., third beam pair). The first wireless device 405-a may perform communications using the third set of beams at 415 based on performing communications using the first set of beams at 410. In some aspects, the third set of beams may include a third beam and at least one of the first beam or the second beam from the first set of beams, where the third beam is generated using a third set of antenna elements of the first wireless device 405-a. For example, the first wireless device 405-a may perform communications using a third set of beams which includes the first beam and the third beam. By way of another example, the first wireless device 405-a may perform communications using a third set of beams which includes the second beam and the third beam. The communications performed using the third set of beams may include uplink communications, downlink communications, sidelink communications, or any combination thereof.

In some aspects, as noted previously herein, the third beam and the first or second beam of the third set of beams may be associated with different polarizations (e.g., horizontal polarization, vertical polarization). In some cases, the first wireless device 405-a may perform communications using different set of beams including different combinations of beams in order to identify antenna elements which may be defective. In this regard, the first wireless device 405-a may be configured to perform communications using any quantity of set of beams.

At 420, the first wireless device 405-a may determine powers associated with the beams of the respective sets of beams (e.g., beam pairs) used for communications at 410 and 415. For example, the first wireless device 405-a may determine a first power and a second power associated with the first beam and the second beam of the first set of beams, respectively. Additionally, the first wireless device 405-a may determine a third power associated with the third beam of the third set of beams.

In some aspects, the type of power associated with the respective beams which are determined at 420 may vary depending on the types of communications which are performed according to the first and third set of beams. For example, in some cases, the first wireless device 405-a may transmit an uplink transmission using the first set of beams at 410. In this example, the first power and the second power associated with the first beam and the second beam, respectively, may include transmission powers associated with the uplink transmission. By way of another example, in other cases, the first wireless device 405-a may receive a downlink transmission using the first set of beams at 410. In this example, the first power and the second power associated with the first beam and the second beam, respectively, may include reception powers associated with the downlink transmission.

At 425, the first wireless device 405-a may compare the powers associated with the respective beams of the respective sets of beams which were determined at 420. For example, the first wireless device 405-a may compare the first power and the second power associated with the first beam and the second beam of the first set of beams, respectively. By way of another example, in cases where the third set of beams includes the third beam and the first beam, the first wireless device 405-a may compare the third power and a first power associated with the third beam and the first beam of the third set of beams, respectively. Similarly, in cases where the third set of beams includes the third beam and the second beam, the first wireless device 405-a may compare the third power and a second power associated with the second beam and the first beam of the third set of beams, respectively.

In some cases, defective antenna elements may detrimentally affect a power associated with a beam generated by the defective antenna element. Moreover, by performing communications with different sets of beams using different combinations of beams (and therefore different combinations of antenna elements), the comparison of powers associated with different beams may be used to iteratively test for and identify defective antenna elements. Accordingly, the first wireless device 405-a may be configured to compare the powers associated with the beams of the sets of beams in order to identify defective antenna elements, as described in further detail at 430 of process flow 400.

At 430, the first wireless device 405-a may determine (e.g., identify) one or more defective antenna elements. In some aspects, the first wireless device 405-a may determine one or more antenna elements is defective based on performing the communications with the first set of beams at 410, performing the communications with the third set of beams at 415, determining the powers of the respective beams at 420, comparing the powers of the beams at 425, or any combination thereof.

In particular, in some cases, a defective antenna element may generate a beam which is less efficient for transmitting communications (e.g., transmitting uplink communications) and/or receiving communications (e.g., receiving downlink communications). As such, a defective antenna element may reduce a transmission power of a transmission performed using a beam generated by the defective antenna element, and may reduce a reception power of a transmission received using a beam generated by the defective antenna element. Accordingly, differences in powers associated with beams of the respective sets of beams (e.g., beam pairs) may be used to identify beams which are generated with defective antenna elements.

For example, in some cases, the first wireless device 405-a may determine that the first power ($P_1$) associated with the first beam of the first set of beams is less than the second power ($P_2$) associated with the second beam of the first set of beams (e.g., $P_1<P_2$). In this example, the first wireless device 405-a may determine that at least one antenna element of the first set of antenna elements is defective based on the first power being less than the second power (e.g., based on determining $P_1<P_2$). Conversely, by way of another example, the first wireless device 405-a may determine that the second power ($P_2$) associated with the second beam of the first set of beams is less than the first power ($P_1$) associated with the first beam of the first set of beams (e.g., $P_2<P_1$). In this example, the first wireless device 405-a may determine that at least one antenna element of the second set of antenna elements is defective based on the second power being less than the first power (e.g., based on determining $P_2<P_1$).

Continuing with the same example, upon determining that the first set of antenna elements and/or the second set of antenna elements includes a defective antenna element, the first wireless device 405-a may continue comparing powers of different beams of different sets of beams to iteratively determine which specific antenna element(s) of the respective sets of antenna elements are defective. For instance, the first wireless device 405-a may determine that the first set of antenna elements and the third set of antenna elements both include a defective antenna element. In this example, the first wireless device 405-a may additionally determine that a single antenna element is shared across the first set of antenna elements and the third set of antenna elements, and may therefore determine that the single antenna element is defective.

In some aspects, the first wireless device 405-a may generate an alert indicating that the at least one antenna element is defective. The alert may include a visual alert, an audio alert, a haptic alert (e.g., vibration), and the like. For example, the alert may be displayed as a push notification on a GUI of the first wireless device 405-a. In some aspects, the alert may indicate a metric indicative of a performance degradation of the at least one antenna element. For example, the alert may indicate that the at least one antenna element is defective, but that the defect of the antenna element will result in only marginal degradation of the performance of the antenna element, beams generated by the antenna element, the first wireless device 405-a, or any combination thereof. As such, the alert may notify the user of the defective antenna element, but indicate that the defect will not prevent efficient operation of the first wireless device 405-a. Comparatively, by way of another example, the alert may indicate that the at least one antenna element is defective, and that the defect of the antenna element will result in significant degradation of the performance of the antenna element, beams generated by the antenna element, the first wireless device 405-a, or any combination thereof. As such, the alert may indicate that the defect may prevent efficient operation of the first wireless device 405-a, and may instruct the user to consider replacing or repairing the defective antenna element and/or first wireless device 405-a.

At 435, the first wireless device 405-a may identify beams which are (or are not) generated using defective antenna elements. In this regard, first wireless device 405-a may identify beams which are (or are not) generated using defective antenna elements based on performing the communications with the first set of beams at 410, performing the communications with the third set of beams at 415, determining the powers of the respective beams at 420, comparing the powers of the beams at 425, determining defective antenna elements at 430, or any combination thereof.

For example, upon identifying a defective antenna element within the first set of antenna elements used to generate the first beam, the first wireless device 405-a may determine that the first beam is associated with a defective antenna element, and may therefore exhibit degraded performance. Continuing with this example, the first wireless device 405-a may identify one or more additional beams which are generated using the defective antenna element. In some aspects, the first wireless device 405-a may identify one or more beams which are generated using defective antenna elements based on a codebook which maps antenna elements of the first wireless device 405-a with beams of the first wireless device 405-a.

Through identifying beams which are associated with defective antenna elements, the first wireless device 405-a may additionally identify beams which are not associated with defective antenna elements. In this regard, the first wireless device 405-a may determine which antenna elements of the first wireless device 405-a may exhibit degraded performance, and which may exhibit expected performance.

At 440, the first wireless device 405-a may add one or more beams which are generated using defective antenna elements to a list of blacklisted beams. In this regard, the first wireless device 405-a may add the one or more beams to the list of blacklisted beams at 445 based on determining the one or more defective antenna elements at 430, determining beams which are generated using defective antenna element at 435, or both. In some aspects, the first wireless device 405-*a* may be configured to refrain from performing communications using beams which are included in the list of blacklisted beams. As such, the first wireless device 405-*a* may be configured to add the one or more beams which are generated using defective antenna elements to the list of blacklisted beams to ensure that the beams are not used for wireless communications.

At 445, the first wireless device 405-*a* may initiate a timer based on adding the one or more beams to the list of blacklisted beams at 440. In some aspects, the timer may define a duration of time in which the one or more beams will remain within the list of blacklisted beams, and therefore define a duration of time that the one or more beams will not be used for wireless communications. In some aspects, the duration of the timer may be signaled to the first wireless device 405-*a* (e.g., via RRC signaling or other control signaling), configured (e.g., pre-configured) at the first wireless device 405-*a*, or both. Additionally, or alternatively, the first wireless device 405-*a* may selectively adjust the duration of the timer based on one or more parameters including, but not limited to, a quantity of beams within the list of blacklisted beams, a severity of the defect associated with the defective antenna elements, and the like.

At 450, the first wireless device 405-*a* may transmit an indication of the one or more beams which are generated using the at least one defective antenna element (e.g., defective beams). In this regard, the first wireless device 405-*a* may transmit the indication of the one or more beams at 450 based on determining the one or more defective antenna elements at 430, determining beams which are generated using defective antenna element at 435, or both. Additionally, or alternatively, the first wireless device 405-*a* may transmit the indication of the one or more beams at 450 based on adding the one or more beams to the list of blacklisted beams at 440. For example, in some cases, the first wireless device 405-*a* may transmit an indication of the list of blacklisted beams, an indication of a codebook which maps beams to antenna elements, or both.

In some aspects, the indication of the one or more beams transmitted by the first wireless device 405-*a* at 450 may serve as a request not to configure the first wireless device 405-*a* to perform wireless communications with the one or more defective beams. In other words, the first wireless device 405-*a* may transmit the indication of the one or more beams so that the second wireless device 405-*b* does not request or expect the first wireless device 405-*a* to perform communications with beams that are generated using defective antenna elements.

At 455, the first wireless device 405-*a* may receive, from the second wireless device 405-*b*, an indication associated with one or more TCI states for performing communications at the first wireless device 405-*a*. The first wireless device 405-*a* may receive the one or more TCI states based on (e.g., in response to) transmitting the indication of the one or more beams at 450.

In some aspects, the one or more TCI states indicated at 455 may be associated with one or more beams at the first wireless device 405-*a*. In this regard, the one or more TCI states may instruct the first wireless device 405-*a* to perform wireless communications with the one or more beams which are associated with the one or more indicated TCI states. In some cases, the one or more TCI states may be associated with beams which were not indicated to the second wireless device 405-*b* at 450, and which are not generated using defective antenna elements. In other words, the second wireless device 405-*b* may configure the first wireless device 405-*a* to perform wireless communications with beams which are not included within the list of blacklisted beams (e.g., beams which are not generated using defective antenna elements) via the indication of the TCI states.

At 460, the first wireless device 405-*a* may switch from the first set of beams (e.g., first beam pair) to a second set of beams (e.g., second beam pair). In some aspects, the first wireless device 405-*a* may switch from the first set of beams to the second set of beams based on determining the one or more defective antenna elements at 430, determining beams which are generated using defective antenna element at 435, or both. Additionally, or alternatively, the first wireless device 405-*a* may switch from the first set of beams to the second set of beams based on adding the one or more beams to the list of blacklisted beams at 440, determining that the second set of beams is generated using beams which are not included within the list of blacklisted beams, receiving the one or more TCI states at 455, any combination thereof.

For example, in some aspects, the one or more TCI states may indicate two beams which are associated with the second set of beams, and the first wireless device 405-*a* may switch to the second set of beams based on (e.g., in accordance with) the one or more TCI states. The first wireless device 405-*a* may be configured to perform one or more beam switching procedures in order to switch from the first set of beams to the second set of beams. In some aspects, beam switching procedures performed by the first wireless device 405-*a* may include retuning of radio frequency components, back-end processing, and the like.

At 465, the first wireless device 405-*a* may communicate with the second wireless device 405-*b* using the second set of beams. In some aspects, the second set of beams may include beams which are not generated using defective antenna elements. As such, the first wireless device 405-*a* may communicate using the second set of beams based on determining the one or more defective antenna elements at 430, determining beams which are not generated using defective antenna elements at 435, adding the one or more beams to the list of blacklisted beams at 440, initiating the timer at 445, transmitting the indication of the defective beams at 450, receiving the one or more TCI states at 455, switching to the second set of beams at 460, or any combination thereof. Moreover, the first wireless device 405-*a* may communicate using the second set of beams based on determining that the beams associated with the second set of beams are not included within the list of blacklisted beams.

In some aspects, as noted previously herein, the beams of the second set of beams may be associated with different polarizations (e.g., horizontal polarization, vertical polarization). Moreover, the communications performed using the second set of beams may include uplink communications, downlink communications, sidelink communications, and the like.

At 470, the first wireless device 405-*a* may determine an expiration of the timer. The first wireless device 405-*a* may determine the expiration of the timer based on adding the one or more beams to the list of blacklisted beams at 440, initiating the timer at 445, the duration of the timer, or any combination thereof. As noted previously herein, the duration of the timer may be signaled to the first wireless device 405-*a*, pre-configured at the first wireless device 405-*a*, or both.

At 475, the first wireless device 405-*a* may remove the one or more beams from the list of blacklisted beams. In other words, the first wireless device 405-*a* may remove the beams which were added to the list of blacklisted beams at 440 from the list of blacklisted beams. In some aspects, the first wireless device 405-*a* may remove the one or more beams from the list of blacklisted beams based on the expiration of the timer. In some aspects the first wireless device 405-*a* may remove the one or more beams from the list of blacklisted beams in order to re-test the beams and determine whether or not the antenna elements used to generate the beams are still defective.

At 480, the first wireless device 405-*a* may perform communications using an additional set of beams (e.g., additional beam pair). In some aspects, the additional set of beams may include one or more beams which were added to the list of blacklisted beams at 440 and/or removed from the list of blacklisted beams at 475. In this regard, the first wireless device 405-*a* may perform wireless communications using the additional set of beams in order to test whether antenna elements used to generate the beams of the additional set of beams are still defective.

Accordingly, the first wireless device 405-*a* may be configured to repeat the steps/functions of process flow 400 in order to re-test the antenna elements associated with the additional set of beams. For example, the first wireless device 405-*a* may be configured to determine beam powers associated with the beams of the additional set of beams, compare the determined powers, determine whether the antenna elements are still defective (and/or if other antenna elements are defective), determine whether the beams are still defective, re-add defective beams to the list of blacklisted beams, initiate a timer for the blacklisted beams, inform the second wireless device 405-*b* of the defective beams, determine an expiration of the timer, and remove the blacklisted beams to re-test the antenna elements.

In some aspects, the first wireless device 405-*a* may be configured to continuously perform the cyclical process of testing beams, adding beams to the list of blacklisted beams, and removing the beams from the list of blacklisted beams. However, in some implementations, the first wireless device 405-*a* may be configured to leave beams in the list of blacklisted beams indefinitely. For example, if a given beam has been added and removed from the list of blacklisted beams a threshold quantity of times, the first wireless device 405-*a* may be configured to permanently blacklist the given beam.

Techniques described herein may enable the first wireless device 405-*a* (e.g., UE 115) to identify defective antenna elements, and refrain from performing communications using beams which are generated using defective antenna elements. Accordingly, techniques described herein may improve a reliably of wireless communications performed at the first wireless device 405-*a*, thereby reducing a quantity of retransmissions which are performed by the first wireless device 405-*a*, reducing power consumption, improving battery life, and improving overall user experience. Further, techniques described herein may reduce or eliminate increased in operational temperatures at the first wireless device 405-*a* which are attributable to defective antenna elements, thereby further improving battery performance and preventing potential safety concerns.

Figure 5:
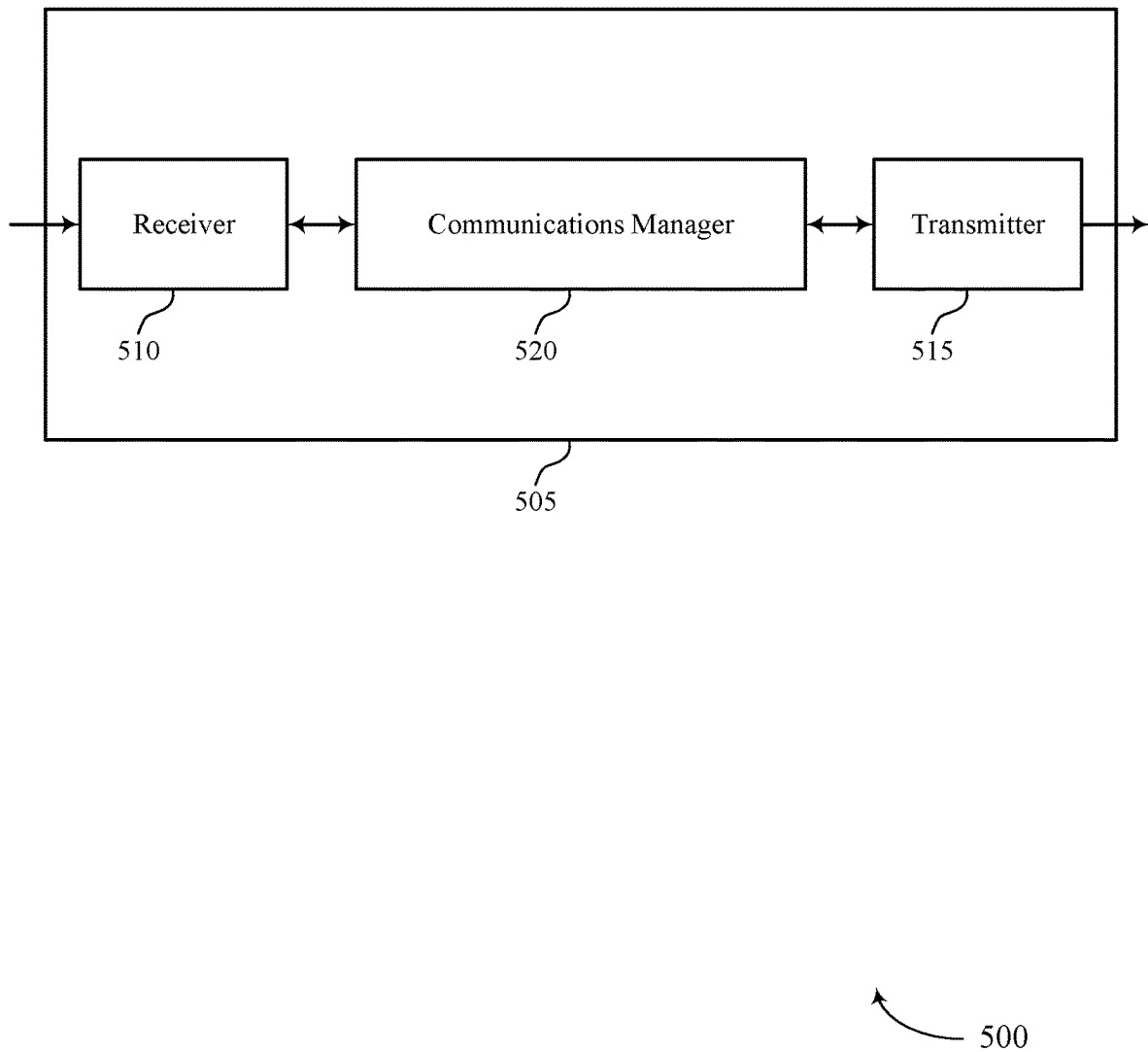
FIGS. 5 and 6 show block diagrams of devices that support beam management techniques for damaged antenna elements in accordance with aspects of the present disclosure.

FIG. 5 shows a block diagram 500 of a device 505 that supports beam management techniques for damaged antenna elements in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to beam management techniques for damaged antenna elements). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to beam management techniques for damaged antenna elements). In some examples, the transmitter 515 may be co-located with a receiver 510 in a transceiver component. The transmitter 515 may utilize a single antenna or a set of multiple antennas.

The communications manager 520, the receiver 510, the transmitter 515, or various combinations thereof or various components thereof may be examples of means for performing various aspects of beam management techniques for damaged antenna elements as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first wireless device in accordance with examples as disclosed herein. For example, the communications manager 520 may be configured as or otherwise support a means for communicating with a second wireless device using a first set of beams, the first set of beams including a first beam and a second beam, the first beam generated via a first set of antenna elements and the second beam generated via a second set of antenna elements different from the first set of antenna elements. The communications manager 520 may be configured as or otherwise support a means for comparing a first power associated with the first beam and a second power associated with the second beam. The communications manager 520 may be configured as or otherwise support a means for determining that at least one antenna element from the first set of antenna elements, the second set of antenna elements, or both, is defective based on the comparison. The communications manager 520 may be configured as or otherwise support a means for switching from the first set of beams to a second set of beams based on the at least one antenna element being defective. The communications manager 520 may be configured as or otherwise support a means for communicating with the second wireless device using the second set of beams.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for identifying defective antenna elements, and refraining from performing communications using beams which are generated using defective antenna elements. Accordingly, techniques described herein may improve a reliably of wireless communications performed at a UE 115, thereby reducing a quantity of retransmissions which are performed by the UE 115, reducing power consumption, improving battery life, and improving overall user experience. Further, techniques described herein may reduce or eliminate increased in operational temperatures at the UE 115 which are attributable to defective antenna elements, thereby further improving battery performance and preventing potential safety concerns.

Figure 6:
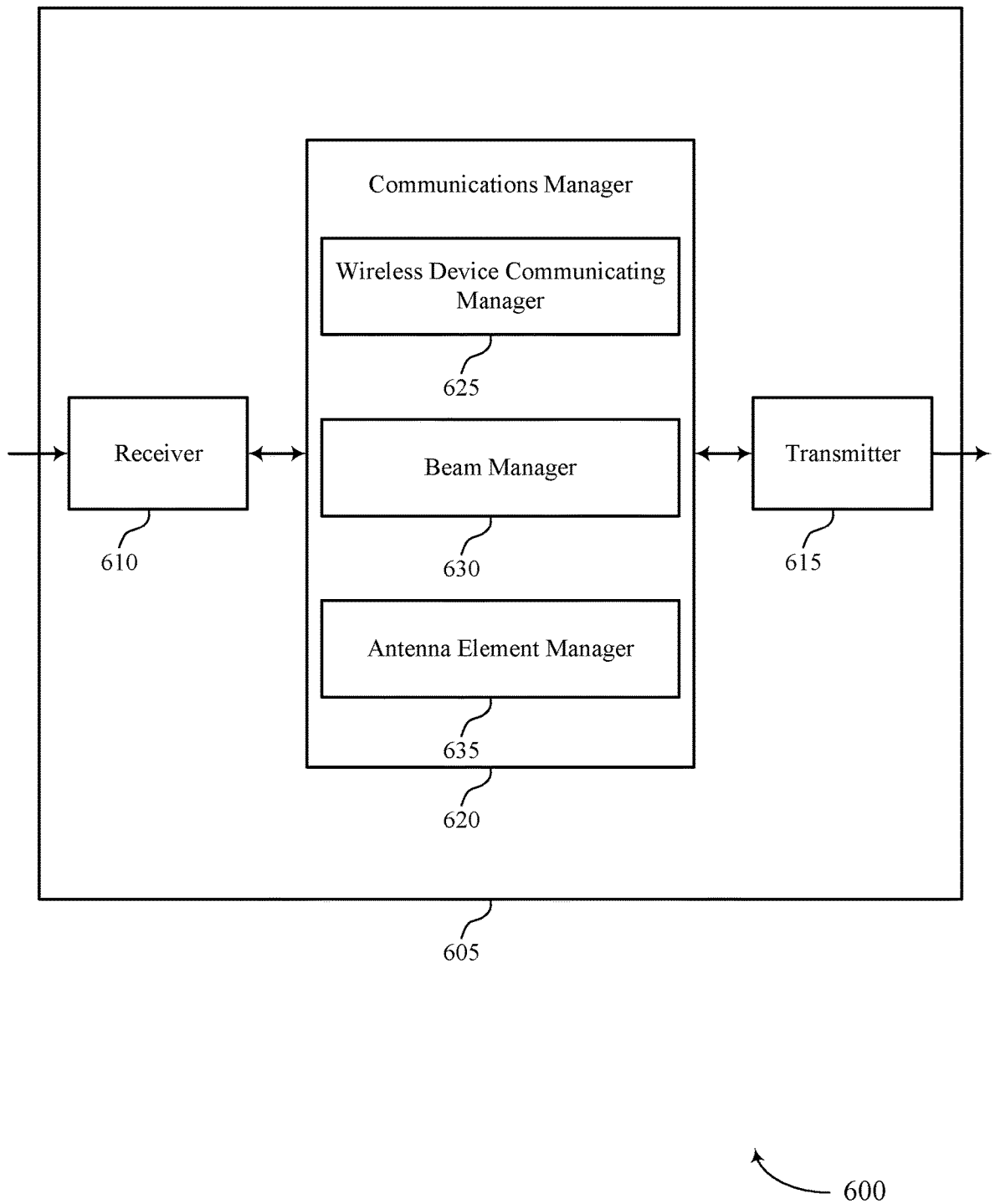

FIG. 6 shows a block diagram 600 of a device 605 that supports beam management techniques for damaged antenna elements in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to beam management techniques for damaged antenna elements). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to beam management techniques for damaged antenna elements). In some examples, the transmitter 615 may be co-located with a receiver 610 in a transceiver component. The transmitter 615 may utilize a single antenna or a set of multiple antennas.

The device 605, or various components thereof, may be an example of means for performing various aspects of beam management techniques for damaged antenna elements as described herein. For example, the communications manager 620 may include a wireless device communicating manager 625, a beam manager 630, an antenna element manager 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first wireless device in accordance with examples as disclosed herein. The wireless device communicating manager 625 may be configured as or otherwise support a means for communicating with a second wireless device using a first set of beams, the first set of beams including a first beam and a second beam, the first beam generated via a first set of antenna elements and the second beam generated via a second set of antenna elements different from the first set of antenna elements. The beam manager 630 may be configured as or otherwise support a means for comparing a first power associated with the first beam and a second power associated with the second beam. The antenna element manager 635 may be configured as or otherwise support a means for determining that at least one antenna element from the first set of antenna elements, the second set of antenna elements, or both, is defective based on the comparison. The beam manager 630 may be configured as or otherwise support a means for switching from the first set of beams to a second set of beams based on the at least one antenna element being defective. The wireless device communicating manager 625 may be configured as or otherwise support a means for communicating with the second wireless device using the second set of beams.

Figure 7:
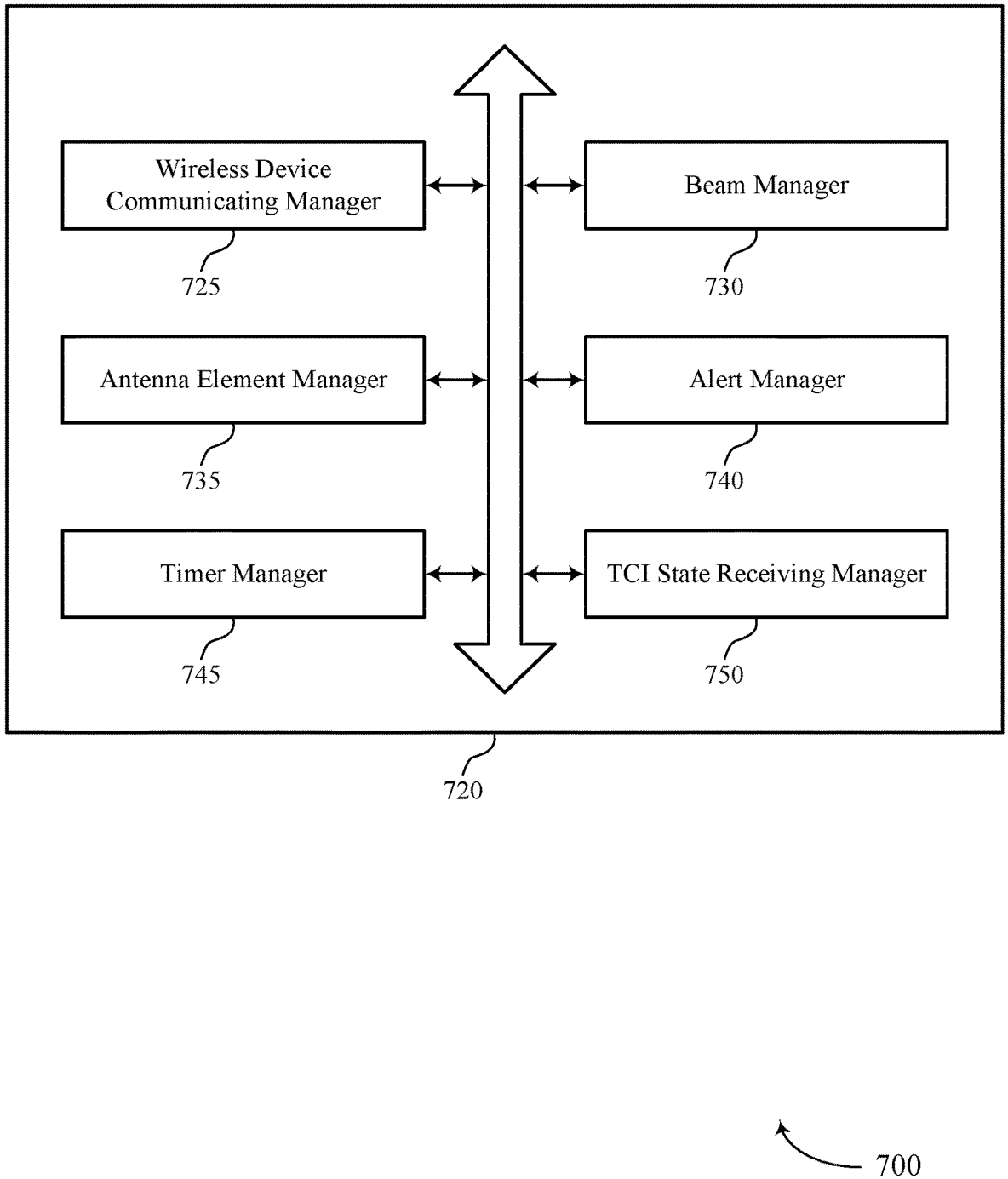
FIG. 7 shows a block diagram of a communications manager that supports beam management techniques for damaged antenna elements in accordance with aspects of the present disclosure.

FIG. 7 shows a block diagram 700 of a communications manager 720 that supports beam management techniques for damaged antenna elements in accordance with aspects of the present disclosure. The communications manager 720 may be an example of aspects of a communications manager 520, a communications manager 620, or both, as described herein. The communications manager 720, or various components thereof, may be an example of means for performing various aspects of beam management techniques for damaged antenna elements as described herein. For example, the communications manager 720 may include a wireless device communicating manager 725, a beam manager 730, an antenna element manager 735, an alert manager 740, a timer manager 745, a TCI state receiving manager 750, or any combination thereof. Each of these components may communicate, directly or indirectly, with one another (e.g., via one or more buses).

The communications manager 720 may support wireless communication at a first wireless device in accordance with examples as disclosed herein. The wireless device communicating manager 725 may be configured as or otherwise support a means for communicating with a second wireless device using a first set of beams, the first set of beams including a first beam and a second beam, the first beam generated via a first set of antenna elements and the second beam generated via a second set of antenna elements different from the first set of antenna elements. The beam manager 730 may be configured as or otherwise support a means for comparing a first power associated with the first beam and a second power associated with the second beam. The antenna element manager 735 may be configured as or otherwise support a means for determining that at least one antenna element from the first set of antenna elements, the second set of antenna elements, or both, is defective based on the comparison. In some examples, the beam manager 730 may be configured as or otherwise support a means for switching from the first set of beams to a second set of beams based on the at least one antenna element being defective. In some examples, the wireless device communicating manager 725 may be configured as or otherwise support a means for communicating with the second wireless device using the second set of beams.

In some examples, the alert manager 740 may be configured as or otherwise support a means for generating an alert indicating that the at least one antenna element is defective. In some examples, the alert indicates a metric indicative of a performance degradation of the at least one antenna element.

In some examples, the beam manager 730 may be configured as or otherwise support a means for adding one or more beams which are generated based on the at least one antenna element to a list of blacklisted beams based on determining the at least one antenna element is defective, where communicating with the second wireless device using the second set of beams is based on adding the one or more beams to the list of blacklisted beams.

In some examples, the beam manager 730 may be configured as or otherwise support a means for determining that the second set of beams includes beams which are not included within the list of blacklisted beams, where communicating with the second wireless device using the second set of beams is based on determining that the second set of beams includes beams which are not included within the list of blacklisted beams.

In some examples, the timer manager 745 may be configured as or otherwise support a means for initiating a timer based on adding the one or more beams to the list of blacklisted beams. In some examples, the beam manager 730 may be configured as or otherwise support a means for removing the one or more beams from the list of blacklisted beams based on an expiration of the timer. In some examples, the wireless device communicating manager 725 may be configured as or otherwise support a means for communicating with the second wireless device using an additional set of beams including at least one beam from the one or more beams based on removing the one or more beams from the list of blacklisted beams.

In some examples, the beam manager 730 may be configured as or otherwise support a means for identifying the one or more beams which are generated using the at least one antenna element based on a codebook which maps a set of multiple antenna elements of the first wireless device with a set of multiple beams of the first wireless device.

In some examples, the beam manager 730 may be configured as or otherwise support a means for determining the first power is less than the second power based on the comparison of the first power and the second power. In some examples, the antenna element manager 735 may be configured as or otherwise support a means for determining that the at least one antenna element which is defective is included within the first set of antenna elements based on determining that the first power is less than the second power.

In some examples, the wireless device communicating manager 725 may be configured as or otherwise support a means for transmitting, to a base station, an indication of one or more beams which are generated using the at least one antenna element based on determining the at least one antenna element is defective.

In some examples, the TCI state receiving manager 750 may be configured as or otherwise support a means for receiving, from the base station in response to the indication of the one or more beams, an additional indication associated with one or more TCI states for performing communications at the first wireless device, where switching from the first set of beams to the second set of beams, communicating with the second wireless device using the second set of beams, or both, is based on the one or more TCI states.

In some examples, the wireless device communicating manager 725 may be configured as or otherwise support a means for communicating with the second wireless device using a third set of beams, the third set of beams including a third beam and one of the first beam or the second beam, the third beam generated via a third set of antenna elements. In some examples, the beam manager 730 may be configured as or otherwise support a means for determining a third power associated with the third beam. In some examples, the antenna element manager 735 may be configured as or otherwise support a means for determining the at least one antenna element is defective is based on a comparison of the first power, the second power, and the third power.

In some examples, the first beam is associated with a first polarization. In some examples, the second beam is associated with a second polarization which is different from the first polarization. In some examples, the first beam is associated with a vertical polarization and the second beam is associated with a horizontal polarization. In some examples, the first beam is associated with the horizontal polarization and the second beam is associated with the vertical polarization.

In some examples, communicating with the second wireless device using the first set of beams, the second set of beams, or both, includes transmitting a first transmission to the second wireless device, receiving a second transmission from the second wireless device, or both. In some examples, communicating with the second wireless device using the first set of beams includes transmitting an uplink transmission to the second wireless device. In some examples, the first power and the second power include transmission powers associated with the uplink transmission. In some examples, communicating with the second wireless device using the first set of beams includes receiving a downlink transmission from the second wireless device. In some examples, the first power and the second power include reception powers associated with the downlink transmission. In some examples, the first wireless device includes a UE. In some examples, the second wireless device includes a base station.

Figure 8:
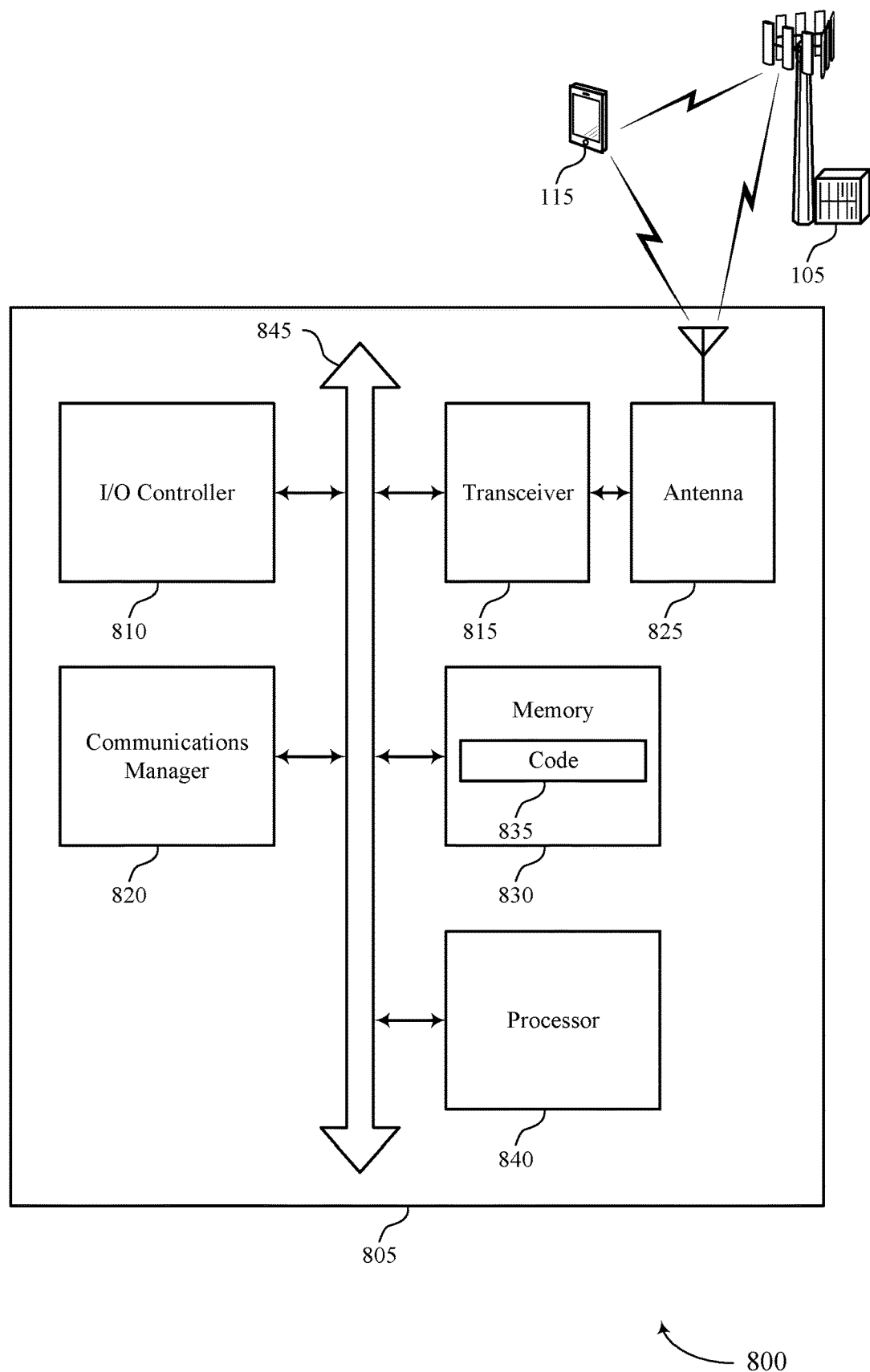
FIG. 8 shows a diagram of a system including a device that supports beam management techniques for damaged antenna elements in accordance with aspects of the present disclosure.

FIG. 8 shows a diagram of a system 800 including a device 805 that supports beam management techniques for damaged antenna elements in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting beam management techniques for damaged antenna elements). For example, the device 805 or a component of the device 805 may include a processor 840 and memory 830 coupled with the processor 840, the processor 840 and memory 830 configured to perform various functions described herein.

The communications manager 820 may support wireless communication at a first wireless device in accordance with examples as disclosed herein. For example, the communications manager 820 may be configured as or otherwise support a means for communicating with a second wireless device using a first set of beams, the first set of beams including a first beam and a second beam, the first beam generated via a first set of antenna elements and the second beam generated via a second set of antenna elements different from the first set of antenna elements. The communications manager 820 may be configured as or otherwise support a means for comparing a first power associated with the first beam and a second power associated with the second beam. The communications manager 820 may be configured as or otherwise support a means for determining that at least one antenna element from the first set of antenna elements, the second set of antenna elements, or both, is defective based on the comparison. The communications manager 820 may be configured as or otherwise support a means for switching from the first set of beams to a second set of beams based on the at least one antenna element being defective. The communications manager 820 may be configured as or otherwise support a means for communicating with the second wireless device using the second set of beams.

By including or configuring the communications manager 820 in accordance with examples as described herein, the device 805 may support techniques for identifying defective antenna elements, and refraining from performing communications using beams which are generated using defective antenna elements. Accordingly, techniques described herein may improve a reliably of wireless communications performed at a UE 115, thereby reducing a quantity of retransmissions which are performed by the UE 115, reducing power consumption, improving battery life, and improving overall user experience. Further, techniques described herein may reduce or eliminate increased in operational temperatures at the UE 115 which are attributable to defective antenna elements, thereby further improving battery performance and preventing potential safety concerns.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of beam management techniques for damaged antenna elements as described herein, or the processor 840 and the memory 830 may be otherwise configured to perform or support such operations.

Figure 9:
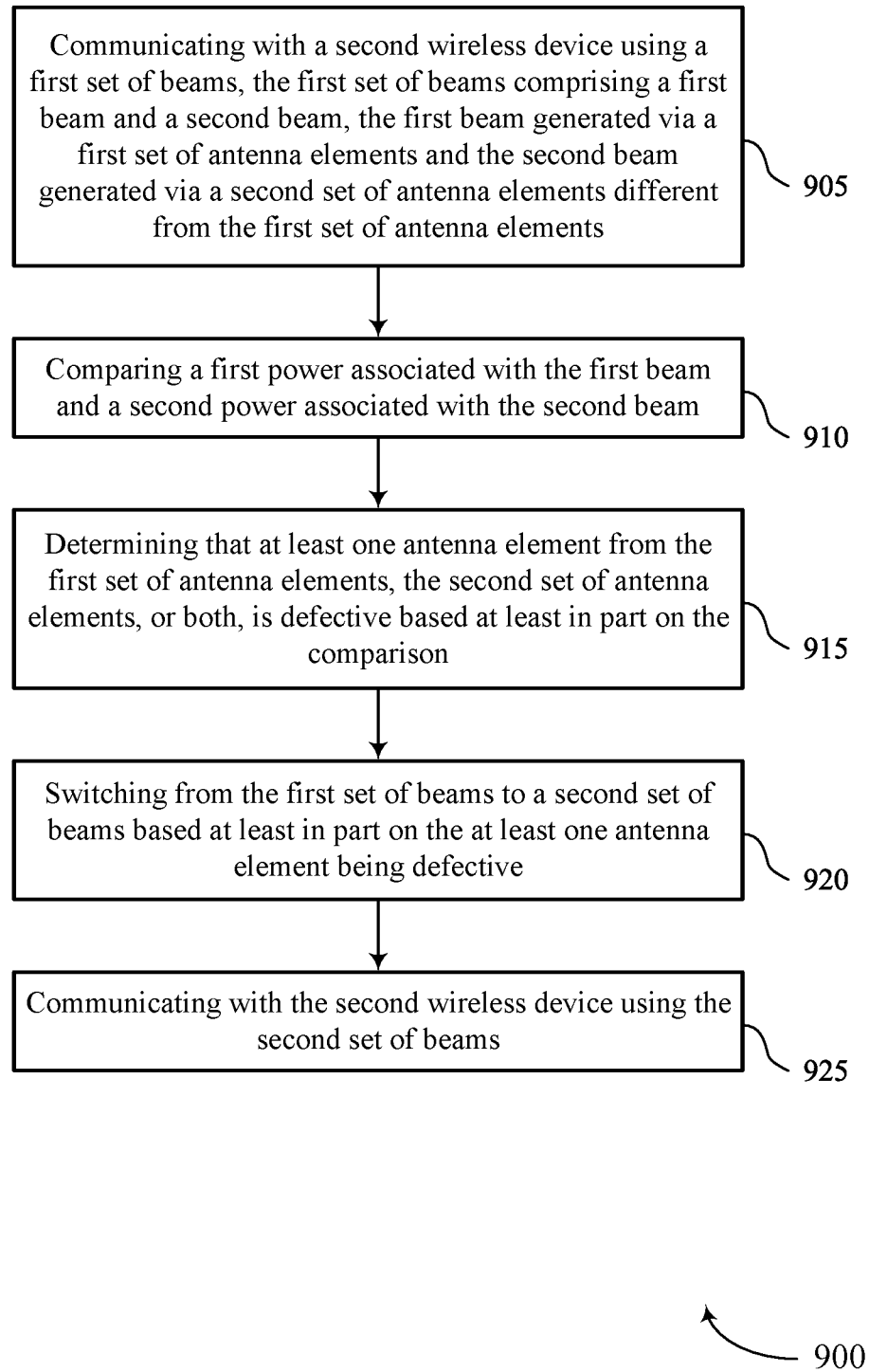
FIGS. 9 through 11 show flowcharts illustrating methods that support beam management techniques for damaged antenna elements in accordance with aspects of the present disclosure.

FIG. 9 shows a flowchart illustrating a method 900 that supports beam management techniques for damaged antenna elements in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include communicating with a second wireless device using a first set of beams, the first set of beams including a first beam and a second beam, the first beam generated via a first set of antenna elements and the second beam generated via a second set of antenna elements different from the first set of antenna elements. The operations of 905 may be performed in accordance with examples as disclosed herein. In some examples, aspects of the operations of 905 may be performed by a wireless device communicating manager 725 as described with reference to FIG. 7.

At 910, the method may include comparing a first power associated with the first beam and a second power associated with the second beam. The operations of 910 may be performed in accordance with examples as disclosed herein. In some examples, aspects of the operations of 910 may be performed by a beam manager 730 as described with reference to FIG. 7.

At 915, the method may include determining that at least one antenna element from the first set of antenna elements, the second set of antenna elements, or both, is defective based on the comparison. The operations of 915 may be performed in accordance with examples as disclosed herein. In some examples, aspects of the operations of 915 may be performed by an antenna element manager 735 as described with reference to FIG. 7.

At 920, the method may include switching from the first set of beams to a second set of beams based on the at least one antenna element being defective. The operations of 920 may be performed in accordance with examples as disclosed herein. In some examples, aspects of the operations of 920 may be performed by a beam manager 730 as described with reference to FIG. 7.

At 925, the method may include communicating with the second wireless device using the second set of beams. The operations of 925 may be performed in accordance with examples as disclosed herein. In some examples, aspects of the operations of 925 may be performed by a wireless device communicating manager 725 as described with reference to FIG. 7.

Figure 10:
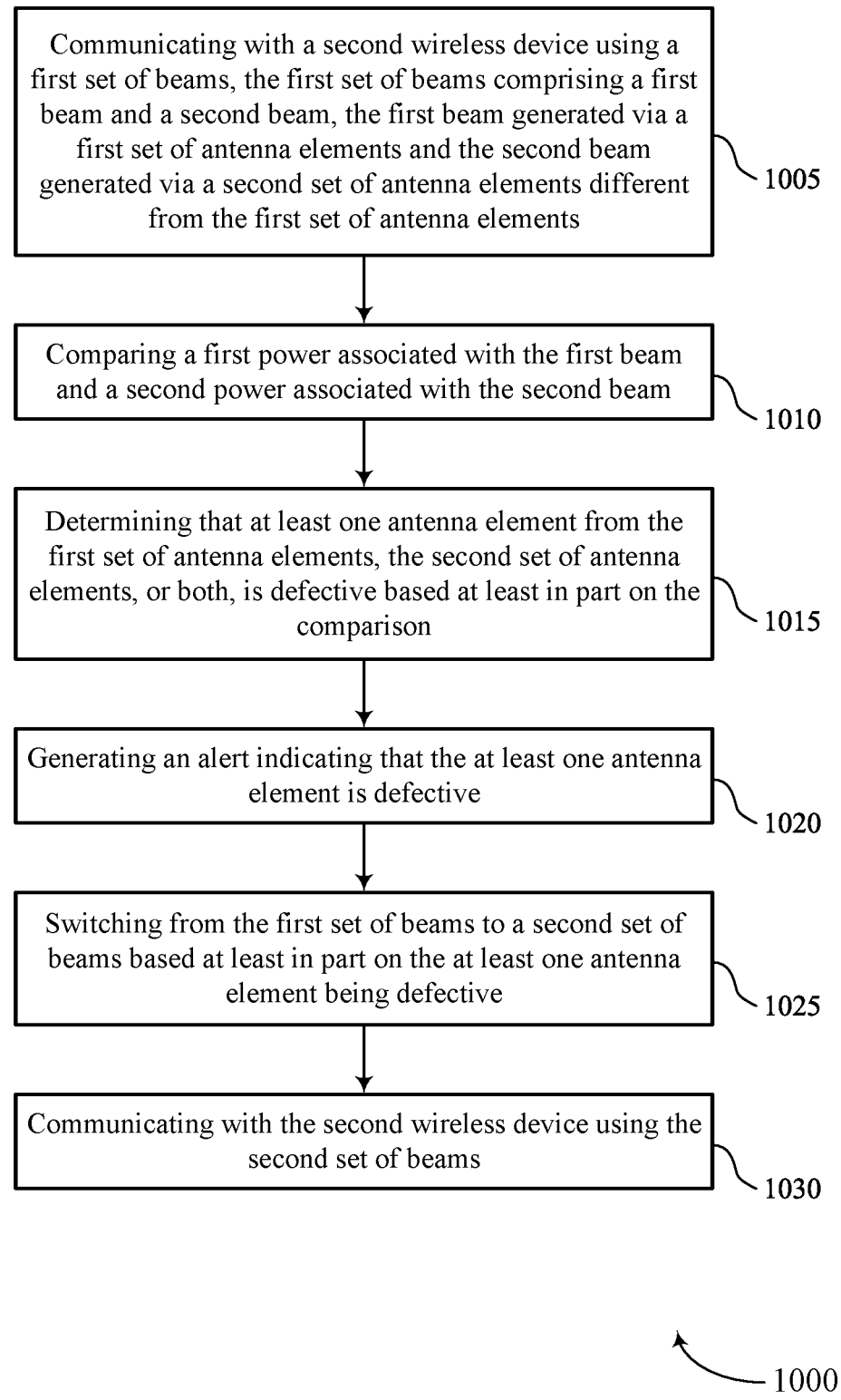

FIG. 10 shows a flowchart illustrating a method 1000 that supports beam management techniques for damaged antenna elements in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1005, the method may include communicating with a second wireless device using a first set of beams, the first set of beams including a first beam and a second beam, the first beam generated via a first set of antenna elements and the second beam generated via a second set of antenna elements different from the first set of antenna elements. The operations of 1005 may be performed in accordance with examples as disclosed herein. In some examples, aspects of the operations of 1005 may be performed by a wireless device communicating manager 725 as described with reference to FIG. 7.

At 1010, the method may include comparing a first power associated with the first beam and a second power associated with the second beam. The operations of 1010 may be performed in accordance with examples as disclosed herein. In some examples, aspects of the operations of 1010 may be performed by a beam manager 730 as described with reference to FIG. 7.

At 1015, the method may include determining that at least one antenna element from the first set of antenna elements, the second set of antenna elements, or both, is defective based on the comparison. The operations of 1015 may be performed in accordance with examples as disclosed herein. In some examples, aspects of the operations of 1015 may be performed by an antenna element manager 735 as described with reference to FIG. 7.

At 1020, the method may include generating an alert indicating that the at least one antenna element is defective. The operations of 1020 may be performed in accordance with examples as disclosed herein. In some examples, aspects of the operations of 1020 may be performed by an alert manager 740 as described with reference to FIG. 7.

At 1025, the method may include switching from the first set of beams to a second set of beams based on the at least one antenna element being defective. The operations of 1025 may be performed in accordance with examples as disclosed herein. In some examples, aspects of the operations of 1025 may be performed by a beam manager 730 as described with reference to FIG. 7.

At 1030, the method may include communicating with the second wireless device using the second set of beams. The operations of 1030 may be performed in accordance with examples as disclosed herein. In some examples, aspects of the operations of 1030 may be performed by a wireless device communicating manager 725 as described with reference to FIG. 7.

Figure 11:
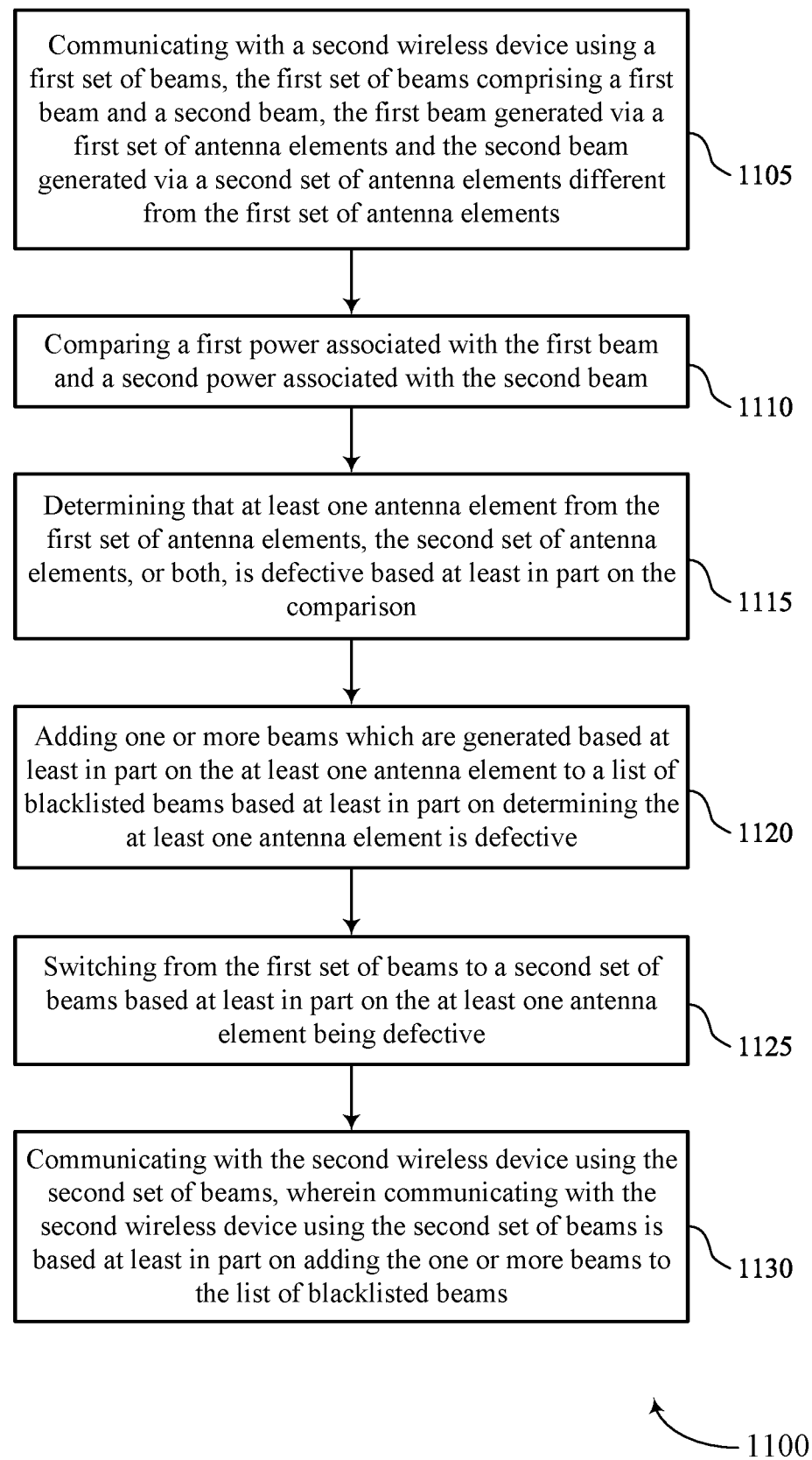

FIG. 11 shows a flowchart illustrating a method 1100 that supports beam management techniques for damaged antenna elements in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1105, the method may include communicating with a second wireless device using a first set of beams, the first set of beams including a first beam and a second beam, the first beam generated via a first set of antenna elements and the second beam generated via a second set of antenna elements different from the first set of antenna elements. The operations of 1105 may be performed in accordance with examples as disclosed herein. In some examples, aspects of the operations of 1105 may be performed by a wireless device communicating manager 725 as described with reference to FIG. 7.

At 1110, the method may include comparing a first power associated with the first beam and a second power associated with the second beam. The operations of 1110 may be performed in accordance with examples as disclosed herein.

In some examples, aspects of the operations of 1110 may be performed by a beam manager 730 as described with reference to FIG. 7.

At 1115, the method may include determining that at least one antenna element from the first set of antenna elements, the second set of antenna elements, or both, is defective based on the comparison. The operations of 1115 may be performed in accordance with examples as disclosed herein. In some examples, aspects of the operations of 1115 may be performed by an antenna element manager 735 as described with reference to FIG. 7.

At 1120, the method may include adding one or more beams which are generated based on the at least one antenna element to a list of blacklisted beams based on determining the at least one antenna element is defective. The operations of 1120 may be performed in accordance with examples as disclosed herein. In some examples, aspects of the operations of 1120 may be performed by a beam manager 730 as described with reference to FIG. 7.

At 1125, the method may include switching from the first set of beams to a second set of beams based on the at least one antenna element being defective. The operations of 1125 may be performed in accordance with examples as disclosed herein. In some examples, aspects of the operations of 1125 may be performed by a beam manager 730 as described with reference to FIG. 7.

At 1130, the method may include communicating with the second wireless device using the second set of beams, where communicating with the second wireless device using the second set of beams is based on adding the one or more beams to the list of blacklisted beams. The operations of 1130 may be performed in accordance with examples as disclosed herein. In some examples, aspects of the operations of 1130 may be performed by a wireless device communicating manager 725 as described with reference to FIG. 7.

The following provides an overview of aspects of the present disclosure:

Aspect 1: A method for wireless communication at a first wireless device, comprising: communicating with a second wireless device using a first set of beams, the first set of beams comprising a first beam and a second beam, the first beam generated via a first set of antenna elements and the second beam generated via a second set of antenna elements different from the first set of antenna elements; comparing a first power associated with the first beam and a second power associated with the second beam; determining that at least one antenna element from the first set of antenna elements, the second set of antenna elements, or both, is defective based at least in part on the comparison; switching from the first set of beams to a second set of beams based at least in part on the at least one antenna element being defective; and communicating with the second wireless device using the second set of beams.

Aspect 2: The method of aspect 1, further comprising: generating an alert indicating that the at least one antenna element is defective.

Aspect 3: The method of aspect 2, wherein the alert indicates a metric indicative of a performance degradation of the at least one antenna element.

Aspect 4: The method of any of aspects 1 through 3, further comprising: adding one or more beams which are generated based at least in part on the at least one antenna element to a list of blacklisted beams based at least in part on determining the at least one antenna element is defective, wherein communicating with the second wireless device using the second set of beams is based at least in part on adding the one or more beams to the list of blacklisted beams.

Aspect 5: The method of aspect 4, further comprising: determining that the second set of beams includes beams which are not included within the list of blacklisted beams, wherein communicating with the second wireless device using the second set of beams is based at least in part on determining that the second set of beams includes beams which are not included within the list of blacklisted beams.

Aspect 6: The method of any of aspects 4 through 5, further comprising: initiating a timer based at least in part on adding the one or more beams to the list of blacklisted beams; removing the one or more beams from the list of blacklisted beams based at least in part on an expiration of the timer; and communicating with the second wireless device using an additional set of beams including at least one beam from the one or more beams based at least in part on removing the one or more beams from the list of blacklisted beams.

Aspect 7: The method of any of aspects 4 through 6, further comprising: identifying the one or more beams which are generated using the at least one antenna element based at least in part on a codebook which maps a plurality of antenna elements of the first wireless device with a plurality of beams of the first wireless device.

Aspect 8: The method of any of aspects 1 through 7, further comprising: determining the first power is less than the second power based at least in part on the comparison of the first power and the second power; and determining that the at least one antenna element which is defective is included within the first set of antenna elements based at least in part on determining that the first power is less than the second power.

Aspect 9: The method of any of aspects 1 through 8, further comprising: transmitting, to a base station, an indication of one or more beams which are generated using the at least one antenna element based at least in part on determining the at least one antenna element is defective.

Aspect 10: The method of aspect 9, further comprising: receiving, from the base station in response to the indication of the one or more beams, an additional indication associated with one or more TCI states for performing communications at the first wireless device, wherein switching from the first set of beams to the second set of beams, communicating with the second wireless device using the second set of beams, or both, is based at least in part on the one or more TCI states.

Aspect 11: The method of any of aspects 1 through 10, further comprising: communicating with the second wireless device using a third set of beams, the third set of beams comprising a third beam and one of the first beam or the second beam, the third beam generated via a third set of antenna elements; and determining a third power associated with the third beam; and determining the at least one antenna element is defective is based at least in part on a comparison of the first power, the second power, and the third power.

Aspect 12: The method of any of aspects 1 through 11, wherein the first beam is associated with a first polarization, and the second beam is associated with a second polarization which is different from the first polarization.

Aspect 13: The method of aspect 12, wherein the first beam is associated with a vertical polarization and the second beam is associated with a horizontal polarization, or the first beam is associated with the horizontal polarization and the second beam is associated with the vertical polarization.

Aspect 14: The method of any of aspects 1 through 13, wherein communicating with the second wireless device using the first set of beams, the second set of beams, or both, comprises transmitting a first transmission to the second wireless device, receiving a second transmission from the second wireless device, or both.

Aspect 15: The method of any of aspects 1 through 14, wherein communicating with the second wireless device using the first set of beams comprises transmitting an uplink transmission to the second wireless device, and the first power and the second power comprise transmission powers associated with the uplink transmission.

Aspect 16: The method of any of aspects 1 through 15, wherein communicating with the second wireless device using the first set of beams comprises receiving a downlink transmission from the second wireless device, and the first power and the second power comprise reception powers associated with the downlink transmission.

Aspect 17: The method of any of aspects 1 through 16, wherein the first wireless device comprises a UE, and the second wireless device comprises a base station.

Aspect 18: An apparatus for wireless communication at a first wireless device, comprising a processor; memory coupled with the processor; and instructions stored in the memory and executable by the processor to cause the apparatus to perform a method of any of aspects 1 through 17.

Aspect 19: An apparatus for wireless communication at a first wireless device, comprising at least one means for performing a method of any of aspects 1 through 17.

Aspect 20: A non-transitory computer-readable medium storing code for wireless communication at a first wireless device, the code comprising instructions executable by a processor to perform a method of any of aspects 1 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first wireless device, comprising:
communicating with a second wireless device using a first set of beams, the first set of beams comprising a first beam and a second beam, the first beam generated via a first set of antenna elements and the second beam generated via a second set of antenna elements different from the first set of antenna elements;
comparing a first power associated with the first beam and a second power associated with the second beam;
determining that at least one antenna element from the first set of antenna elements, the second set of antenna elements, or both, is defective based at least in part on the comparison;
switching from the first set of beams to a second set of beams based at least in part on the at least one antenna element being defective; and
communicating with the second wireless device using the second set of beams.

2. The method of claim 1, further comprising:
generating an alert indicating that the at least one antenna element is defective.

3. The method of claim 2, wherein the alert indicates a metric indicative of a performance degradation of the at least one antenna element.

4. The method of claim 1, further comprising:
adding one or more beams which are generated based at least in part on the at least one antenna element to a list of blacklisted beams based at least in part on determining the at least one antenna element is defective, wherein communicating with the second wireless device using the second set of beams is based at least in part on adding the one or more beams to the list of blacklisted beams.

5. The method of claim 4, further comprising:
determining that the second set of beams includes beams which are not included within the list of blacklisted beams, wherein communicating with the second wireless device using the second set of beams is based at least in part on determining that the second set of beams includes beams which are not included within the list of blacklisted beams.

6. The method of claim 4, further comprising:
initiating a timer based at least in part on adding the one or more beams to the list of blacklisted beams;
removing the one or more beams from the list of blacklisted beams based at least in part on an expiration of the timer; and
communicating with the second wireless device using an additional set of beams including at least one beam from the one or more beams based at least in part on removing the one or more beams from the list of blacklisted beams.

7. The method of claim 4, further comprising:
identifying the one or more beams which are generated using the at least one antenna element based at least in part on a codebook which maps a plurality of antenna elements of the first wireless device with a plurality of beams of the first wireless device.

8. The method of claim 1, further comprising:
determining the first power is less than the second power based at least in part on the comparison of the first power and the second power; and
determining that the at least one antenna element which is defective is included within the first set of antenna elements based at least in part on determining that the first power is less than the second power.

9. The method of claim 1, further comprising:
transmitting, to a base station, an indication of one or more beams which are generated using the at least one antenna element based at least in part on determining the at least one antenna element is defective.

10. The method of claim 9, further comprising:
receiving, from the base station in response to the indication of the one or more beams, an additional indication associated with one or more transmission-configuration indicator states for performing communications at the first wireless device, wherein switching from the first set of beams to the second set of beams, communicating with the second wireless device using the second set of beams, or both, is based at least in part on the one or more transmission-configuration indicator states.

11. The method of claim 1, further comprising:
communicating with the second wireless device using a third set of beams, the third set of beams comprising a third beam and one of the first beam or the second beam, the third beam generated via a third set of antenna elements;
determining a third power associated with the third beam; and
determining the at least one antenna element is defective is based at least in part on a comparison of the first power, the second power, and the third power.

12. The method of claim 1, wherein the first beam is associated with a first polarization, and the second beam is associated with a second polarization which is different from the first polarization.

13. The method of claim 12, wherein the first beam is associated with a vertical polarization and the second beam is associated with a horizontal polarization, or wherein the first beam is associated with the horizontal polarization and the second beam is associated with the vertical polarization.

14. The method of claim 1, wherein communicating with the second wireless device using the first set of beams, the second set of beams, or both, comprises transmitting a first transmission to the second wireless device, receiving a second transmission from the second wireless device, or both.

15. The method of claim 1, wherein communicating with the second wireless device using the first set of beams comprises transmitting an uplink transmission to the second wireless device, and wherein the first power and the second power comprise transmission powers associated with the uplink transmission.

16. The method of claim 1, wherein communicating with the second wireless device using the first set of beams comprises receiving a downlink transmission from the second wireless device, and wherein the first power and the second power comprise reception powers associated with the downlink transmission.

17. The method of claim 1, wherein the first wireless device comprises a user equipment (UE), and the second wireless device comprises a base station.

18. An apparatus for wireless communication at a first wireless device, comprising:
a processor;
memory coupled with the processor; and
instructions stored in the memory and executable by the processor to cause the apparatus to:
communicate with a second wireless device using a first set of beams, the first set of beams comprising a first beam and a second beam, the first beam generated via a first set of antenna elements and the second beam generated via a second set of antenna elements different from the first set of antenna elements;
compare a first power associated with the first beam and a second power associated with the second beam;
determine that at least one antenna element from the first set of antenna elements, the second set of antenna elements, or both, is defective based at least in part on the comparison;
switch from the first set of beams to a second set of beams based at least in part on the at least one antenna element being defective; and
communicate with the second wireless device using the second set of beams.

19. The apparatus of claim 18, wherein the instructions are further executable by the processor to cause the apparatus to:
generate an alert indicating that the at least one antenna element is defective.

20. The apparatus of claim 19, wherein the alert indicates a metric indicative of a performance degradation of the at least one antenna element.

21. The apparatus of claim 18, wherein the instructions are further executable by the processor to cause the apparatus to:
add one or more beams which are generated based at least in part on the at least one antenna element to a list of blacklisted beams based at least in part on determining the at least one antenna element is defective, wherein communicating with the second wireless device using the second set of beams is based at least in part on adding the one or more beams to the list of blacklisted beams.

22. The apparatus of claim 21, wherein the instructions are further executable by the processor to cause the apparatus to:
determine that the second set of beams includes beams which are not included within the list of blacklisted beams, wherein communicating with the second wireless device using the second set of beams is based at least in part on determining that the second set of beams includes beams which are not included within the list of blacklisted beams.

23. The apparatus of claim 21, wherein the instructions are further executable by the processor to cause the apparatus to:
initiate a timer based at least in part on adding the one or more beams to the list of blacklisted beams;
remove the one or more beams from the list of blacklisted beams based at least in part on an expiration of the timer; and
communicate with the second wireless device using an additional set of beams including at least one beam from the one or more beams based at least in part on removing the one or more beams from the list of blacklisted beams.

24. The apparatus of claim 21, wherein the instructions are further executable by the processor to cause the apparatus to:
identify the one or more beams which are generated using the at least one antenna element based at least in part on a codebook which maps a plurality of antenna elements of the first wireless device with a plurality of beams of the first wireless device.

25. The apparatus of claim 18, wherein the instructions are further executable by the processor to cause the apparatus to:
determine the first power is less than the second power based at least in part on the comparison of the first power and the second power; and
determine that the at least one antenna element which is defective is included within the first set of antenna elements based at least in part on determining that the first power is less than the second power.

26. The apparatus of claim 18, wherein the instructions are further executable by the processor to cause the apparatus to:
transmit, to a base station, an indication of one or more beams which are generated using the at least one antenna element based at least in part on determining the at least one antenna element is defective.

27. The apparatus of claim 26, wherein the instructions are further executable by the processor to cause the apparatus to:
receive, from the base station in response to the indication of the one or more beams, an additional indication associated with one or more transmission-configuration indicator states for performing communications at the first wireless device, wherein switching from the first set of beams to the second set of beams, communicating with the second wireless device using the second set of beams, or both, is based at least in part on the one or more transmission-configuration indicator states.

28. The apparatus of claim 18, wherein the instructions are further executable by the processor to cause the apparatus to:
communicate with the second wireless device using a third set of beams, the third set of beams comprising a third beam and one of the first beam or the second beam, the third beam generated via a third set of antenna elements;

determine a third power associated with the third beam; and determine the at least one antenna element is defective is based at least in part on a comparison of the first power, the second power, and the third power.

29. An apparatus for wireless communication at a first wireless device, comprising:

means for communicating with a second wireless device using a first set of beams, the first set of beams comprising a first beam and a second beam, the first beam generated via a first set of antenna elements and the second beam generated via a second set of antenna elements different from the first set of antenna elements;

means for comparing a first power associated with the first beam and a second power associated with the second beam;

means for determining that at least one antenna element from the first set of antenna elements, the second set of antenna elements, or both, is defective based at least in part on the comparison;

means for switching from the first set of beams to a second set of beams based at least in part on the at least one antenna element being defective; and means for communicating with the second wireless device using the second set of beams.

30. A non-transitory computer-readable medium storing code for wireless communication at a first wireless device, the code comprising instructions executable by a processor to:

communicate with a second wireless device using a first set of beams, the first set of beams comprising a first beam and a second beam, the first beam generated via a first set of antenna elements and the second beam generated via a second set of antenna elements different from the first set of antenna elements;

compare a first power associated with the first beam and a second power associated with the second beam;

determine that at least one antenna element from the first set of antenna elements, the second set of antenna elements, or both, is defective based at least in part on the comparison;

switch from the first set of beams to a second set of beams based at least in part on the at least one antenna element being defective; and communicate with the second wireless device using the second set of beams.

* * * * *